(12) United States Patent
McDonnell et al.

(10) Patent No.: US 8,138,772 B2
(45) Date of Patent: Mar. 20, 2012

(54) CAPACITIVE SENSING AND METHOD

(75) Inventors: Judson Grant McDonnell, Howell, MI (US); Phillip Maguire, Royal Oak, MI (US); Shawn Tracy, Macomb, MI (US)

(73) Assignee: TK Holdings Inc., Auburn Hills, MI (US)

( * ) Notice: Subject to any disclaimer, the term of this patent is extended or adjusted under 35 U.S.C. 154(b) by 426 days.

(21) Appl. No.: 12/541,825

(22) Filed: Aug. 14, 2009

(65) Prior Publication Data

US 2010/0039122 A1     Feb. 18, 2010

Related U.S. Application Data

(60) Provisional application No. 61/136,178, filed on Aug. 15, 2008.

(51) Int. Cl.
*G01R 27/26*     (2006.01)

(52) U.S. Cl. .................................... 324/658; 324/667

(58) Field of Classification Search .................. 324/658, 324/667
See application file for complete search history.

(56) References Cited

U.S. PATENT DOCUMENTS

| 2006/0187038 A1* | 8/2006 | Shieh et al. ................ 340/562 |
| 2008/0100425 A1* | 5/2008 | Kiribayashi ............... 340/425.5 |

* cited by examiner

*Primary Examiner* — Vincent Q Nguyen
(74) *Attorney, Agent, or Firm* — Foley & Lardner LLP

(57) ABSTRACT

A capacitive vehicle sensor includes a sensing electrode configured to generate an electric field, a shield electrode configured to reduce the electromagnetic influence of electric fields generated by objects outside of the electric field, a circuit coupled to the sensing electrode and shield electrode that allows a plurality of impedances to be coupled between the sensing electrode and the shield electrode, and a control system. The control system configures the impedances between the sensing electrode and the shield electrode, is configured to measure current to the sensing electrode in each configuration, and is configured to calculate a measure related to the impedance from the sensing electrode to ground.

21 Claims, 23 Drawing Sheets

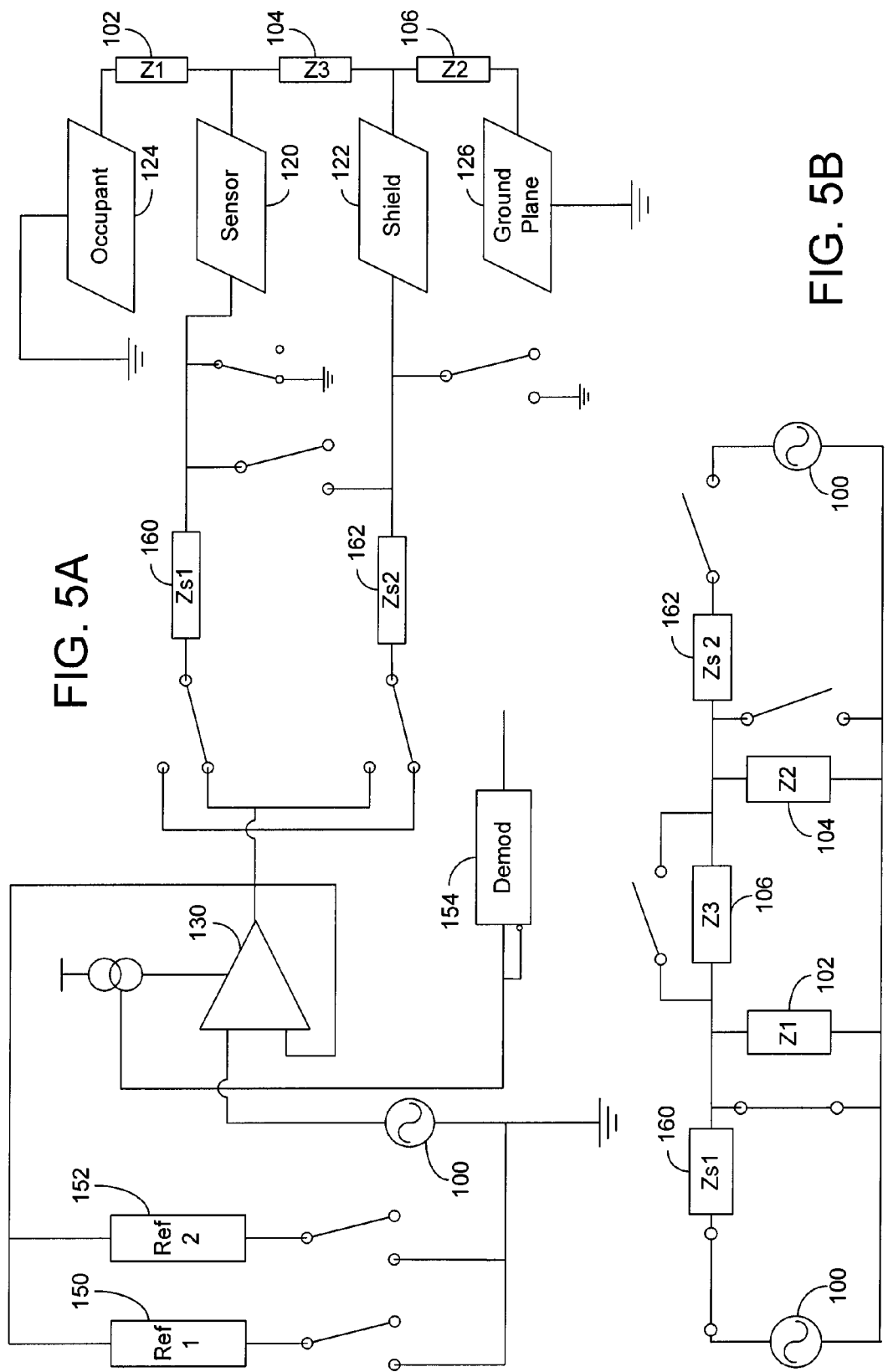

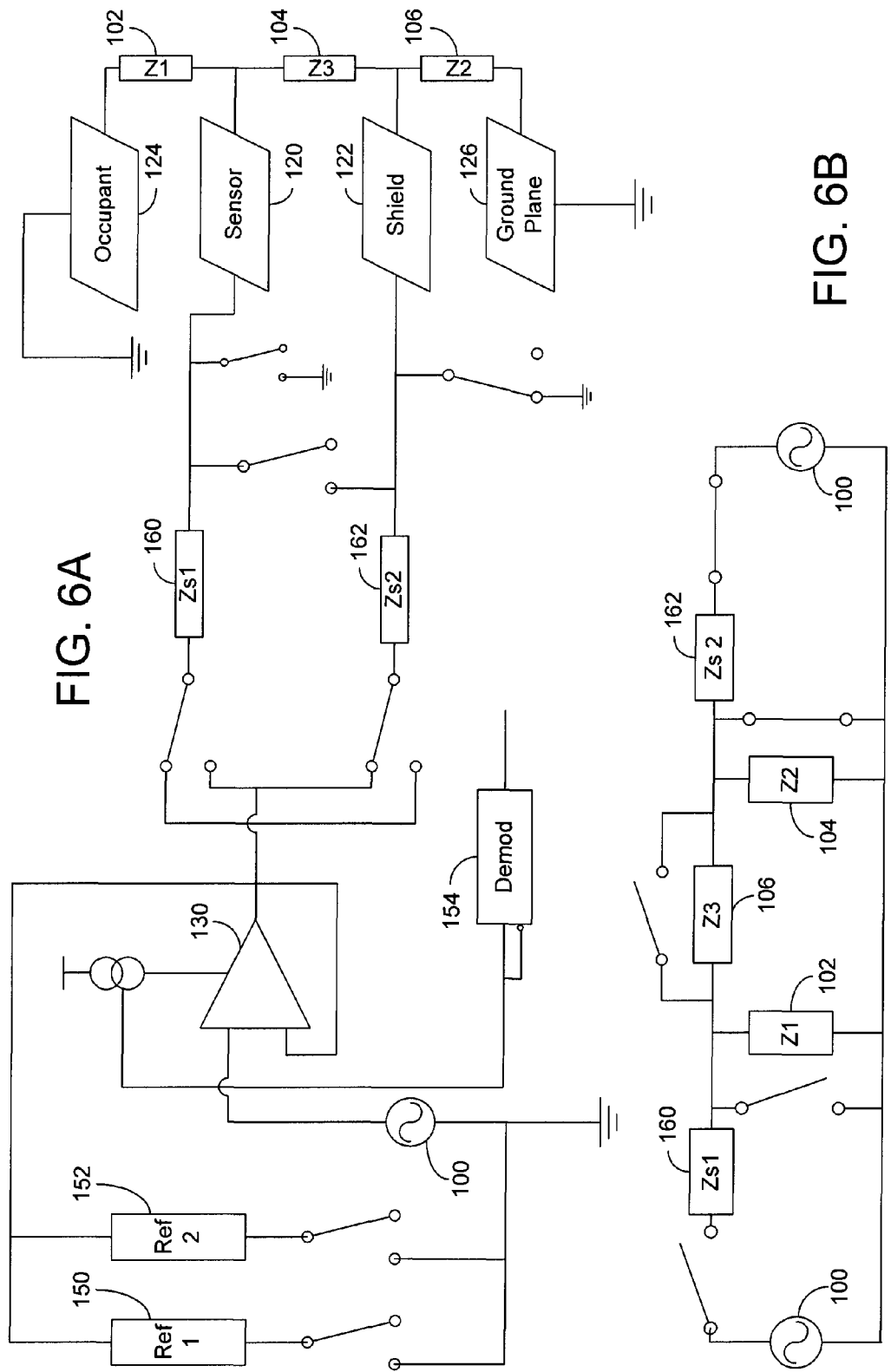

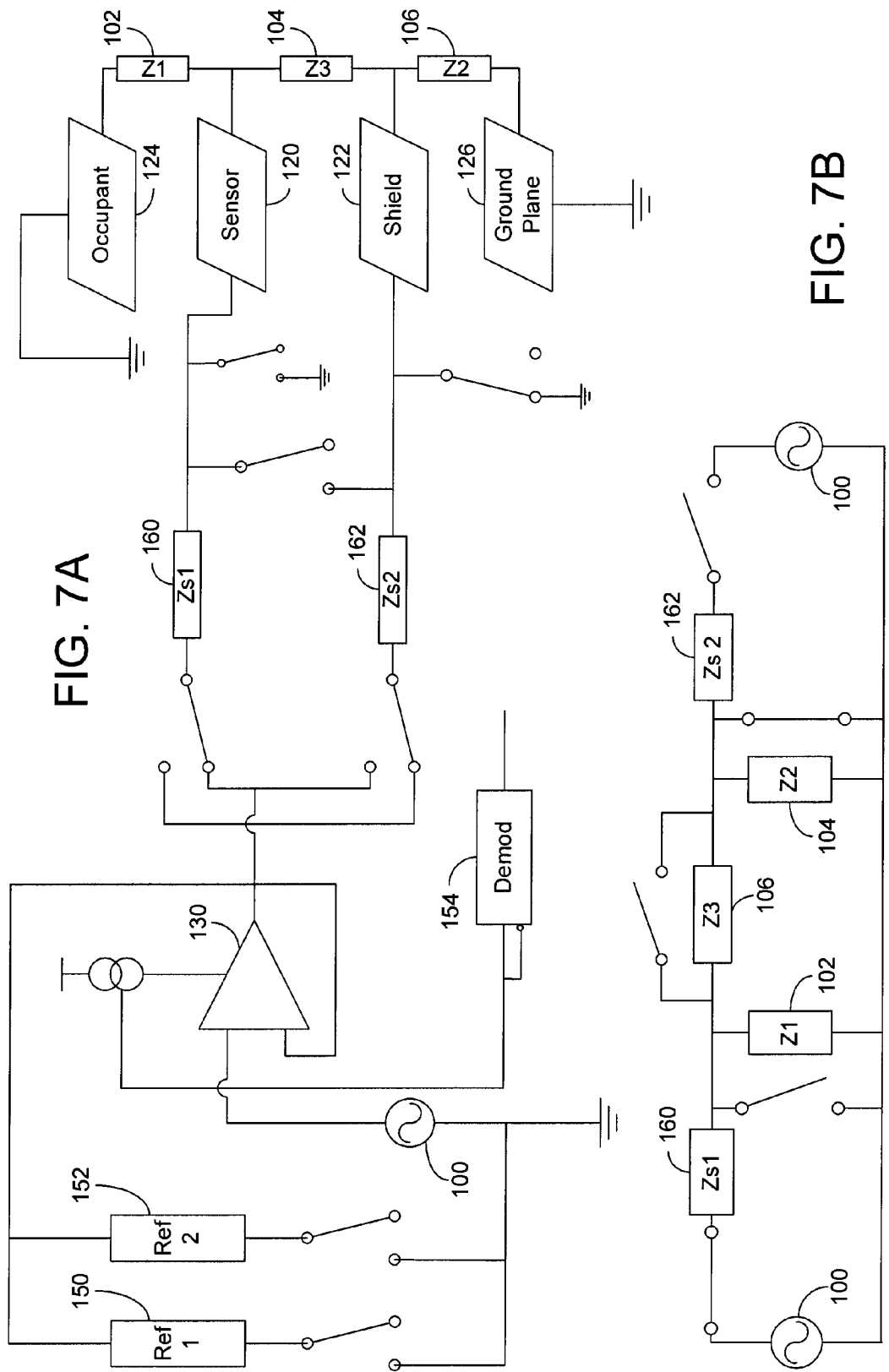

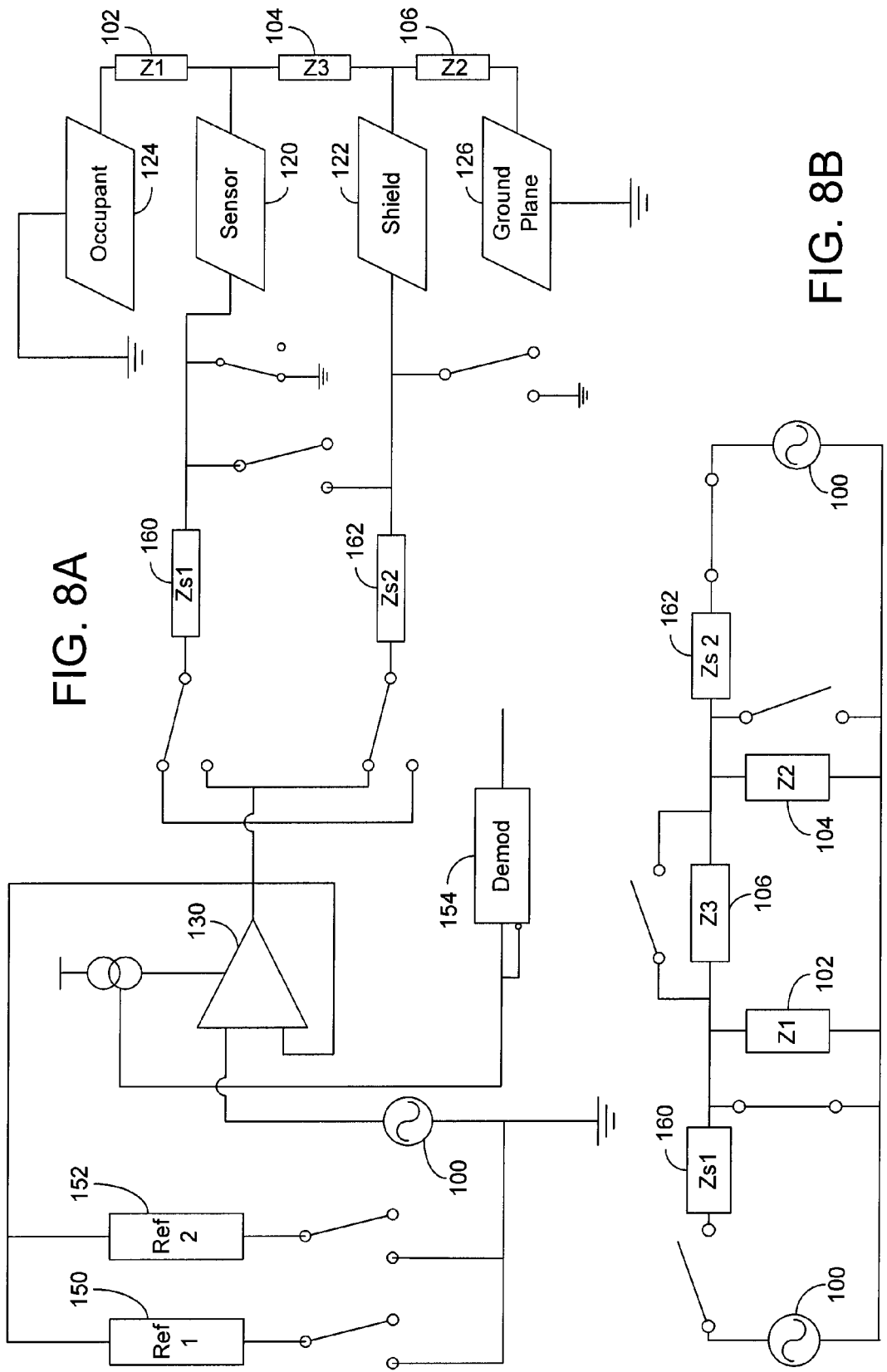

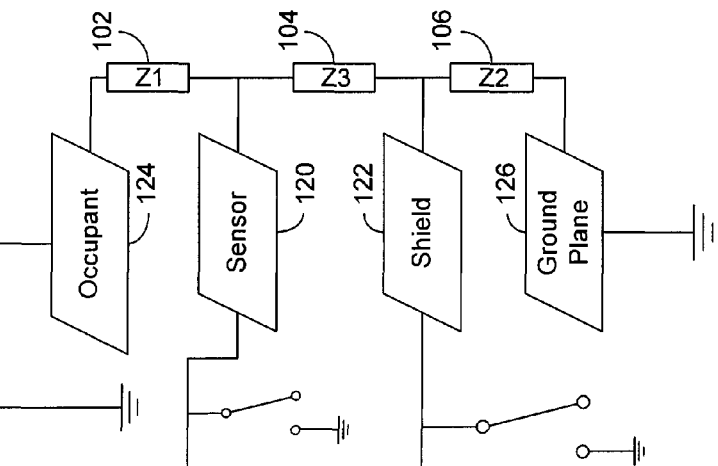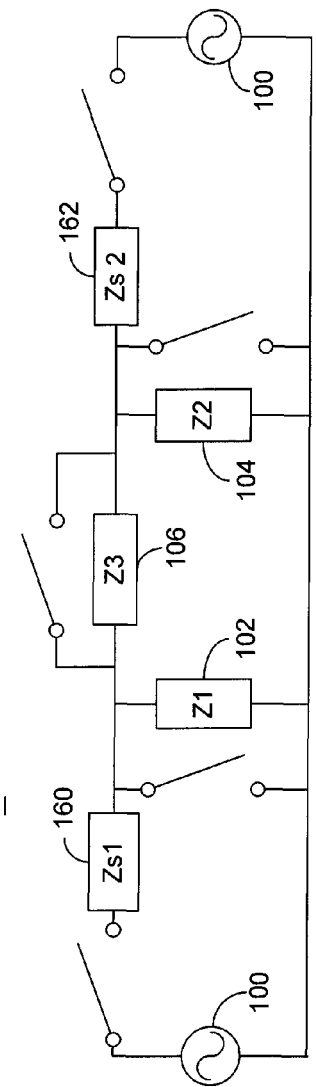
FIG. 10A
FIG. 10B

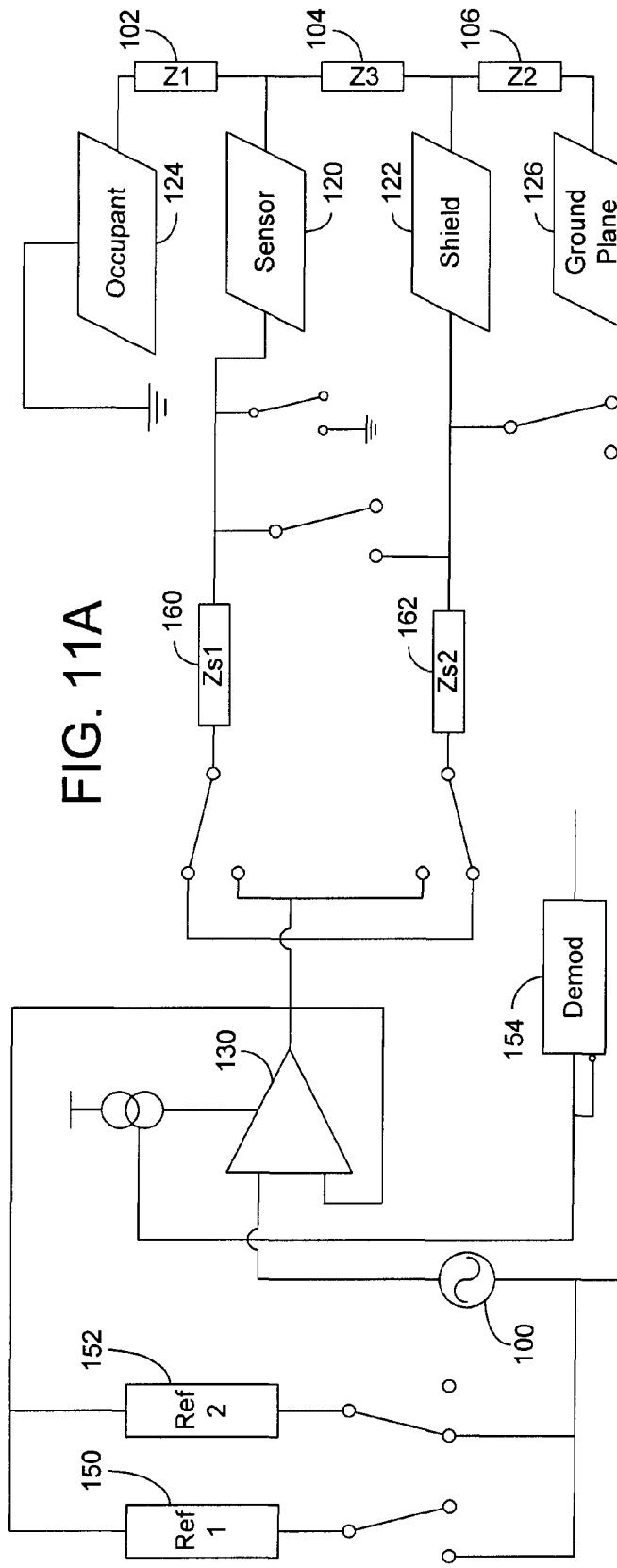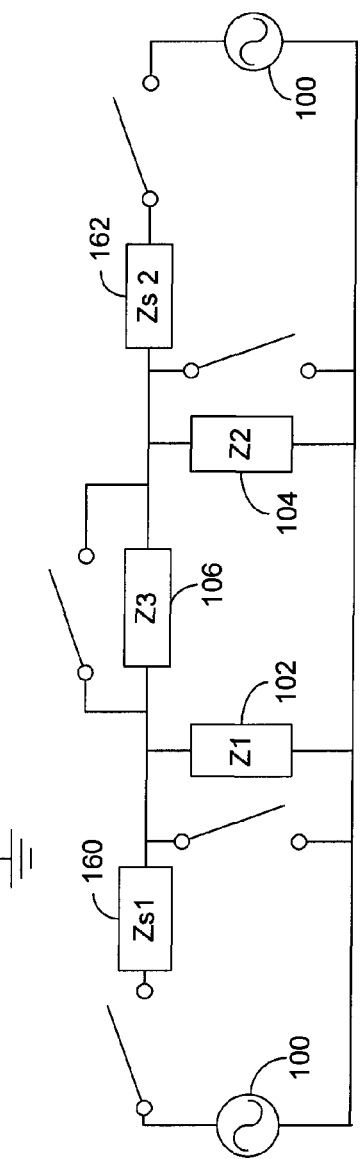
FIG. 11A
FIG. 11B

CAPACITIVE SENSING AND METHOD

CROSS-REFERENCE TO RELATED PATENT APPLICATION

This application claims priority to and the benefit of U.S. Provisional Patent Application No. 61/136,178 filed on Aug. 15, 2008, the entirety of which is herein incorporated by reference.

BACKGROUND

The present disclosure relates generally to the field of capacitive sensors and sensing methods. More specifically, the disclosure relates to capacitive sensors and sensing methods for a vehicle seat.

What is needed is a system and method for more accurate classification of an occupant in an occupant classification system.

SUMMARY

One disclosed embodiment relates to an occupant sensing system for a seat. The an occupant sensing system includes a sensing electrode configured to generate an electric field when power is supplied to the electrode and a shield electrode configured to form a layer parallel to the sensing electrode. The shield layer configured to reduce the electromagnetic influence of electric fields generated by objects located outside of the electric field. The occupant sensing system also includes a circuit coupled to the sensing electrode and is configured to sense a change in the electric field caused by an occupancy state of the seat. The circuit is further configured to ground the shield layer for measuring a first impedance at the sensing electrode, to ground the sensing electrode for measuring a second impedance at the shield layer, to electrically couple the sensing electrode and shield electrode together for measuring a third impedance at the sensing electrode and shield electrode, and to determine the impedance from the sensing electrode to ground based on the first, second, and third impedances. The determined impedance from the sensing electrode to ground does not include an impedance from the sensing electrode to the shield layer.

Another disclosed embodiment relates to a method for measuring a change in capacitance at a vehicle sensor based on an impedance from the sensor to ground. The method includes the step of generating an electric field at a capacitive sensing electrode. The electromagnetic influence of electric fields is generated by objects located outside of the electric field being reduced by a shield layer parallel to the sensing electrode. The method also includes the steps of grounding the shield layer and measuring a first impedance at the sensing electrode, grounding the sensing electrode and measuring a second impedance at the shield electrode, electrically coupling the sensing electrode and shield electrode together and measuring a third impedance at the sensing electrode/shield electrode, and determining the impedance from the sensing electrode to ground based on the first, second, and third impedances. The determined impedance from the sensing electrode to ground does not include an impedance from the sensing electrode to the shield layer.

Another disclosed embodiment relates to a capacitive vehicle sensor including a sensing electrode configured to generate an electric field, a shield electrode configured to reduce the electromagnetic influence of electric fields generated by objects outside of the electric field, a circuit coupled to the sensing electrode and shield electrode that allows a plurality of impedances to be coupled between the sensing electrode and the shield electrode, and a control system. The control system configures the impedances between the sensing electrode and the shield electrode, is configured to measure current to the sensing electrode in each configuration, and is configured to calculate a measure related to the impedance from the sensing electrode to ground.

Another disclosed embodiment relates to an occupant sensing system for a seat including a sensing electrode configured to generate an electric field when a signal is supplied to the electrode, a shield electrode configured to form a layer parallel to the sensing electrode, and a circuit coupled to the sensing electrode and configured to sense a change in the electric field caused by an occupancy state of the seat. The circuit is further configured to allow a plurality of coupling impedances between the sensor and shield. The system calculates a measure related to the impedance from the sensing electrode to ground using the results of separate measurements taken while the coupling impedances are in different configurations.

Another disclosed embodiment relates to a method for measuring a change in capacitance at a vehicle sensor based on an impedance from the sensor to ground. The method includes the steps of generating an electric field at a capacitive sensing electrode, driving the shield layer with a signal substantially equal to the sensing signal and measuring the current sent to the sensing electrode, driving the shield layer with a signal marginally different than the sensing signal and measuring the current sent to the sensing electrode, driving the shield layer with a signal substantially equal to the sensing signal while electrically coupling the sensing electrode and shield electrode together and measuring the current sent to the sensing electrode, driving the shield layer with a signal marginally different than the sensing signal while electrically coupling the sensing electrode and shield electrode together and measuring the current sent to the sensing electrode, and determining the impedance from the sensing electrode to ground based on the four measurements. The determined impedance from the sensing electrode to ground does not include an impedance from the sensing electrode to the shield layer.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements.

FIGS. 5A-B are circuit diagrams of the sensing system of FIG. 1B when measuring a sensor source impedance, according to an exemplary embodiment.

FIGS. 6A-B are circuit diagrams of the sensing system of FIG. 1B when measuring a sensor shield impedance, according to an exemplary embodiment.

FIGS. 7A-B are circuit diagrams of the sensing system of FIG. 1B when measuring an impedance from sensor to ground, according to an exemplary embodiment.

FIGS. 8A-B are circuit diagrams of the sensing system of FIG. 1B when measuring an impedance from shield to ground, according to an exemplary embodiment.

FIGS. 10A-B are circuit diagrams of the sensing system of FIG. 1B when measuring a reference, according to an exemplary embodiment.

FIGS. 11A-B are circuit diagrams of the sensing system of FIG. 1B when measuring a reference, according to another exemplary embodiment.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

A basic capacitive sensor for an occupant classification system or occupant sensing system (for example, a system to detect occupancy in a vehicle seat) may be implemented in many ways. For example, an AC current out to a sensing electrode of the sensor may be measured and used as an indicator of the impedance from the sensing electrode to ground. A seat heater may be used as a capacitive sensor.

In an occupant classification system of a vehicle, the occupant is classified using information from sensors that sense characteristics about the situation on a vehicle seat. Some systems sense the total weight on the seat. When a capacitive sensor is used to classify the occupant, the environment above the seat cover is sensed using various techniques to identify the dielectric and conductive properties of the occupant situation. A conductive sensing element is placed under the seat cover and the impedance from the electrode to ground is an indicator of the occupant situation above the seat cover.

Ideally, the environment below the seat cover does not influence the classification. A resistive heater in the seat is essentially a grounded wire. The sensing electrode for an occupant classification system may be placed above the seat heater. If the orientation between the sensing electrode and the heater changes, the offset capacitance will change and the change may result in a negative impact on the ability of the system to accurately classify the occupant (e.g., if the empty seat offset of the measurement drifts significantly, the system may not accurately classify the occupant).

Referring generally to the figures, an occupant classification system or occupant sensing system is described that uses a sensor (e.g., a capacitive vehicle sensor) to detect seat occupancy. The occupant sensing system may generally include a sensor and a seat heater. To reduce the influence of the heater (and other objects in certain orientations with respect to the sensor) on sensor measurements, a shield layer may be placed between the sensor and heater. The shield could be a grounded shield or could be driven with a potential nearly the same as the sensor (e.g., a driven shield). However, the capacitance between the shield and sensor may cause a sensor inaccuracy. If the spacer thickness between the sensor and shield changes, or if the effective dielectric constant of the spacer material changes due to temperature, the sensor measurement will be influenced. This may even occur when the shield potential is a driven shield potential if the driven shield potential is not perfect.

Figure 1A:
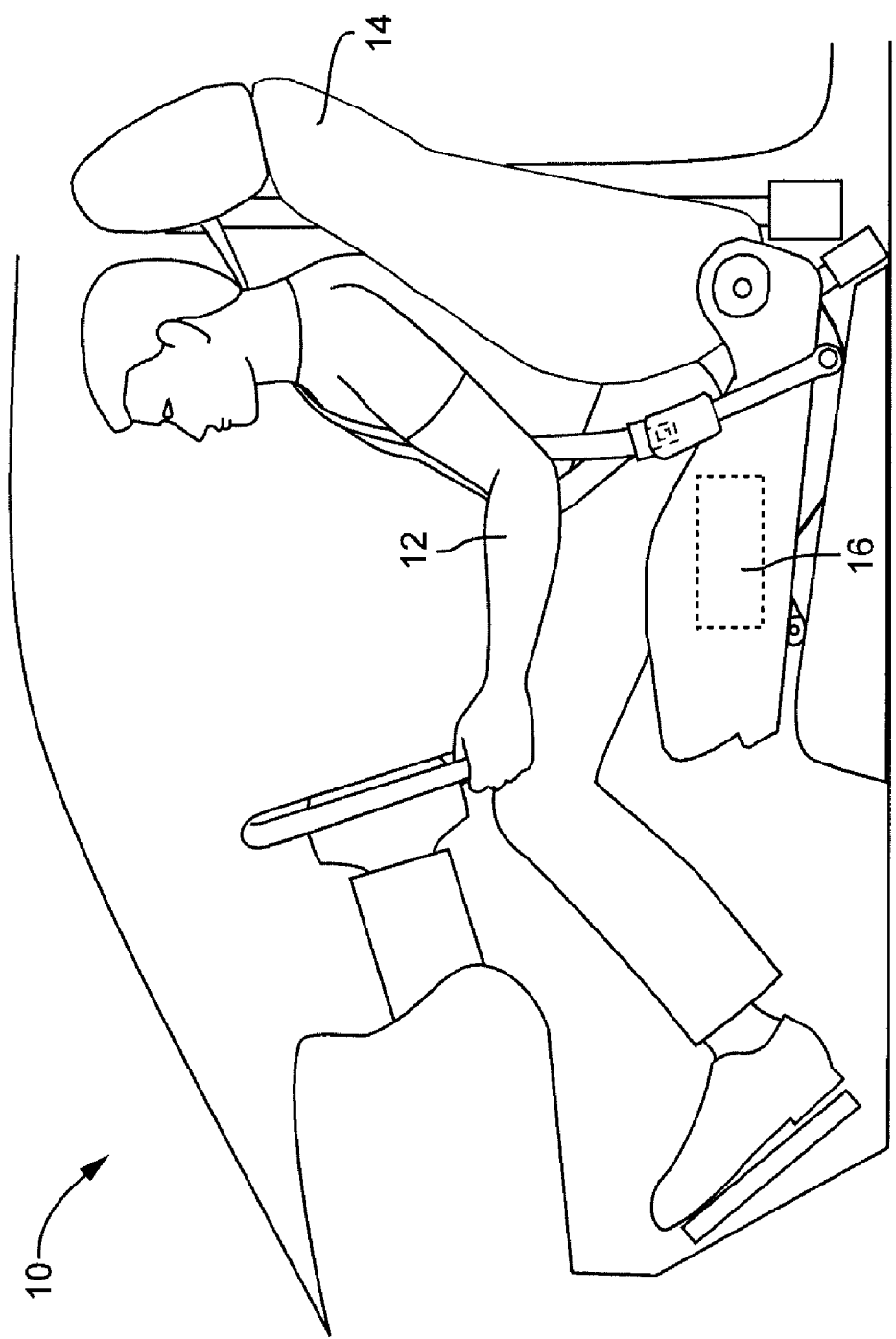
FIG. 1A is a schematic diagram of a vehicle seat, according to an exemplary embodiment.

Referring to FIG. 1A, a vehicle 10 is shown with an occupant 12 in a seat 14 of the vehicle 10, according to an exemplary embodiment. The seat 14 may include an occupant sensing system 16. As shown in FIG. 1A, the occupant sensing system 16 may generally be located in the seat 14 below the area in which an occupant 12 of the vehicle 10 sits, or may be located in other areas of the seat 14 or vehicle 10.

The occupant sensing system 16 may generally include a sensor and sensing system for sensing occupancy of the seat 14. For example, the sensor may determine the weight of the occupant in the seat 14 to determine occupancy characteristics. The occupant sensing system 16 may further include a seat heating system and/or other systems for the seat 14 of the vehicle 10. According to one exemplary embodiment, a seat heating system may be used as an occupancy sensing system.

According to an exemplary embodiment, the occupant sensing system 16 includes a capacitive sensor. The capacitive sensor may generally be capable of sensing properties such as a proximity, position, or weight of an object, or the like. The capacitive sensor may sense based on measuring a change in capacitance (e.g., changes in an electrical property between two conductive objects); the capacitive sensor generally consisting of a conductive object within the occupant sensing system 16 and an object such as an occupant 12. Referring to the present disclosure, the capacitive sensor may be used as an occupancy sensor to detect the presence of an occupant 12 in the seat 14 the occupant sensing system 16 is associated with. As an occupant 12 sits on seat 14, the capacitance change may be used to determine the presence of the occupant 12 by the occupant sensing system 16 or other occupant 12 properties (e.g., weight of the occupant 12).

Figure 1B:
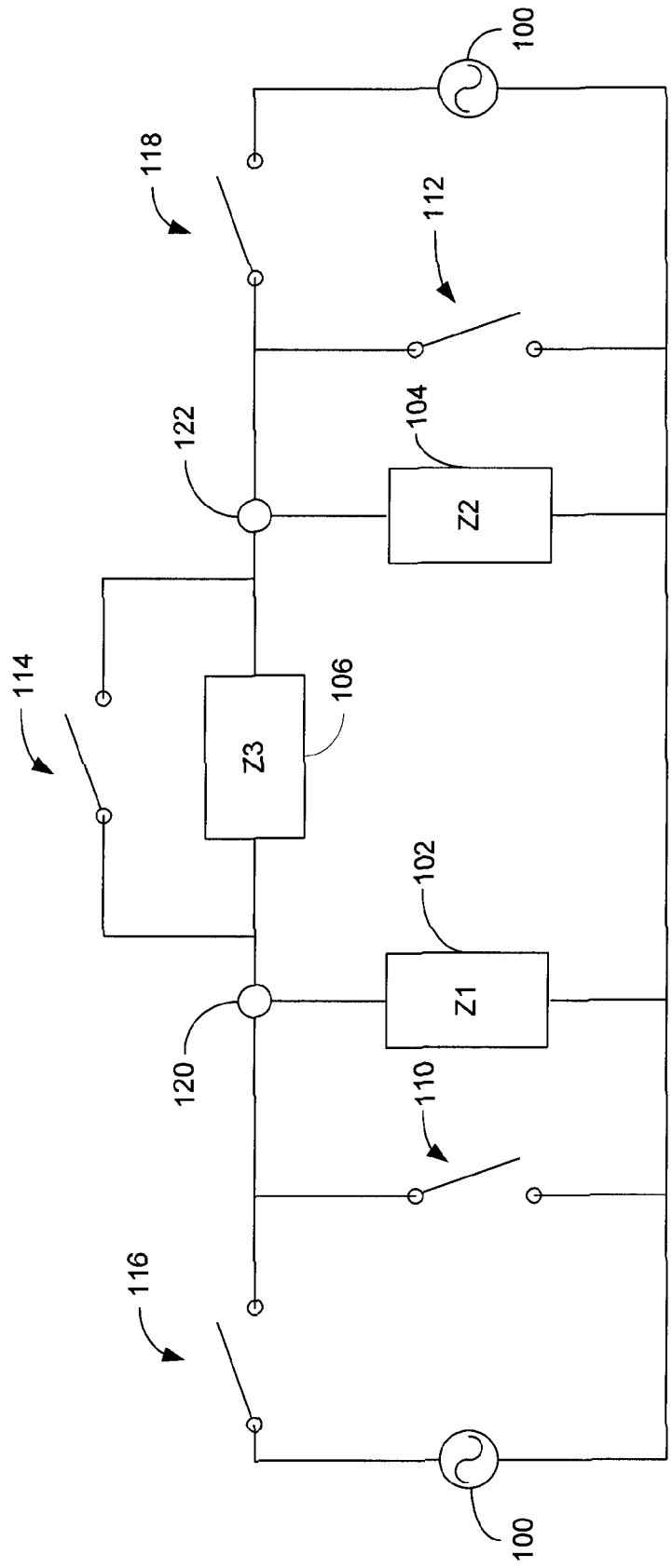
FIG. 1B is a circuit diagram of a sensing system, according to an exemplary embodiment.

Referring to FIG. 1B, a general block level schematic of a circuit of a heater/sensing system (e.g., an occupant sensing system as described in FIG. 1A) with isolating impedances is shown according to an exemplary embodiment. The system includes a sensing element (e.g., sensor 120) and a shield layer (e.g., shield 122). The sensor or sensing electrode 120 is located between impedances 102 and 106 (the impedance 102 is the impedance from the sensor 120 to ground and the impedance 106 is the impedance from the sensor 120 to the shield 122). The sensor 120 is generally configured to generate an electric field. The shield or shield electrode 122 is located between an isolating impedance 104 and the impedance 106 (the impedance 104 is the impedance from the shield 122 to ground). According to some exemplary embodiments, the shield 122 may be a driven shield or driven shield layer, for example an electrode or conductor that receives current from the current source 100 to generate an electrical field for cancelling outside electromagnetic noise. According to other exemplary embodiments, the shield 122 may be a passive shield composed at least partially of a material that may block outside electromagnetic noise. The shield 122 is generally configured to be parallel to the sensor 120 and to reduce the electromagnetic influence of electric field generated by objects located outside of the electric field of the occupant sensing system. Although shown as two separate voltage source 100s, the two voltage source 100s in this configuration are the same voltage source. The voltage source 100s are effectively the voltage source and the current measurement device. Switches 110-114 are shown in varying states in FIG. 1B, and may be changed to provide different configurations as shown in subsequent figures. The circuit of FIG. 1B is configured to sense a change in the electric field based on impedance Z1 and the occupancy state of the seat.

Calculations are used to identify the impedance from the sensor 120 to ground, not including the impedance from the sensor 120 to the node 122 between the isolation impedances. Using the general AC current equation, and where Z1, Z2, and Z3 correspond to the impedances 102, 104, 106, the following equations may be used to determine impedance Z1:

$$I = \frac{V}{Z} \quad (1)$$

(general AC current equation)

$$\text{Impedance Measurement 1 } (M1) = \frac{1}{Z1} + \frac{1}{Z3} \quad (2)$$

(shield 122 is grounded, measure the current between the sensor 120 and ground and between the sensor 120 and grounded shield 122)

$$\text{Impedance Measurement 2 } (M2) = \frac{1}{Z2} + \frac{1}{Z3} \quad (3)$$

(sensor 120 is grounded, measure the current between the shield 122 and ground and between the shield 122 and grounded sensor 120)

$$\text{Impedance Measurement 3 } (M3) = \frac{1}{Z1} + \frac{1}{Z2} \quad (4)$$

(sensor 120 and shield 122 connected, measure the current between the sensor 120 and ground and between the shield 122 and ground)
Solving for impedance Z1:

$$Z1 = \frac{2}{M1 - M2 + M3} \quad (5)$$

The first impedance measurement M1 is an inverse sum of the impedances 102 and 106. For measurement M1, the shield 122 is grounded. The second impedance measurement M2 is an inverse sum of the impedances 104 and 106. For measurement M2, the sensor 120 is grounded. The third impedance measurement M3 is an inverse sum of the impedances 102 and 104. For measurement M3, the sensor 120 and shield 122 are electrically coupled. Using the three impedance measurements, impedance Z1 may be solved. Impedance Z1 (the impedance from the sensor 120 to ground) does not include an impedance from the sensor 120 to the shield 122.

Other multi-measurement methods and calculations may also be used with the occupant sensing system in a way analogous to the three-measurement method as described below. The calculation used to derive the impedance 102 from the sensor to ground is not influenced by the impedance from the sensor 120 to the node 122 between the isolation impedances. The described use of the shield 122 may eliminate the potential problem of measurement variations caused by the current between the sensing electrode 120 and the node 122 between the isolation impedances. Advantageously, the current from the sensing element 120 to the node 122 between the isolation impedances may change due to temperature without affecting the final measurement used for the occupant classification.

Referring to the subsequent figures, according to various exemplary embodiments, an occupant sensing system includes a sensing electrode and a shield layer. A conducting electrode is used as the sensor along with a shield that is roughly in a plane parallel to the sensor and spaced a small distance from the sensor. The sensing system is configured to sense the impedance from the sensing electrode to ground, which is then used as an indicator of the occupant on the seat. The sensor measurement may not be influenced by objects on the "far side" of the shield or by the impedance from the sensor to the shield. A calculation is used to derive the impedance from the sensor to ground, which is not influenced by the impedance from the sensor to shield.

Referring generally to FIGS. 2A-4B, according to one exemplary embodiment, measurements are made in the sensing system in the same three modes described with reference to FIG. 1B. The sensing system includes a voltage source 100, a Load Current Amplifier (LCA) 130, two switches 132, 134 used to change the measurement mode of the system, and a planar sensor 120 and shield 122. The LCA 130 is used to measure the current out to the sensor 120 and/or the shield 122 (depending on the measurement configuration). According to various embodiments, the current out to the sensor 120 and/or shield 122 may be measured using any past, present, or future measurement technique. According to some exemplary embodiments, the LCA 130 may be omitted. The current in the impedance 102 may be calculated using the measured current sourced by the source 100 when placed in three different configurations (the configurations shown in FIGS. 2B, 3B, and 4B).

Figure 2A:
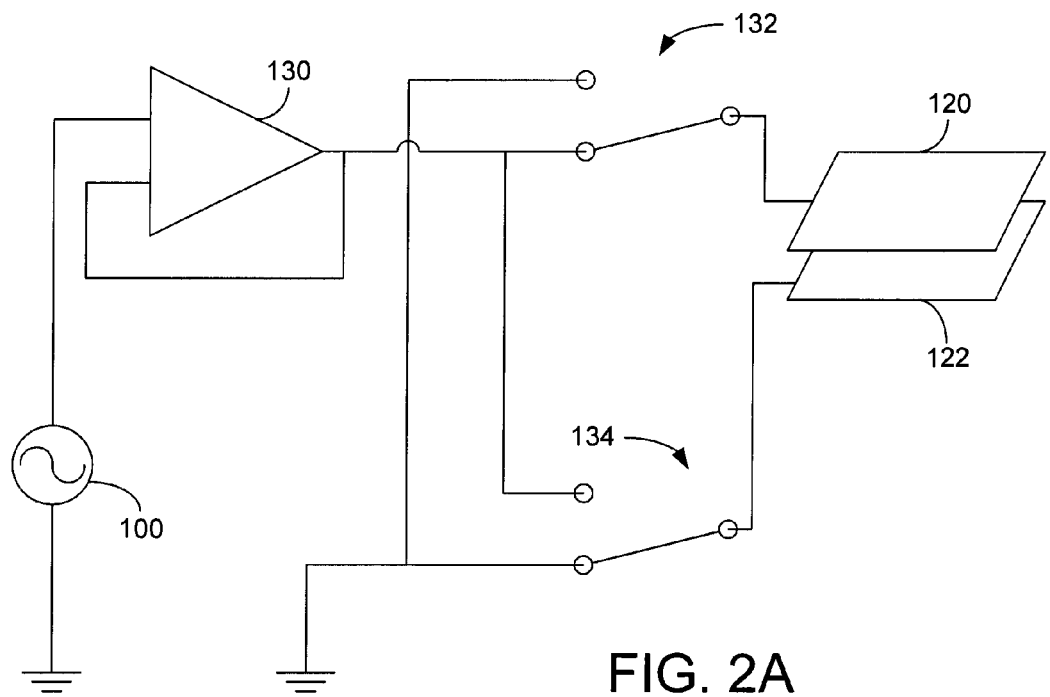
FIGS. 2A-B are circuit diagrams of the sensing system of FIG. 1B when taking a first measurement, according to an exemplary embodiment.
Figure 2B:
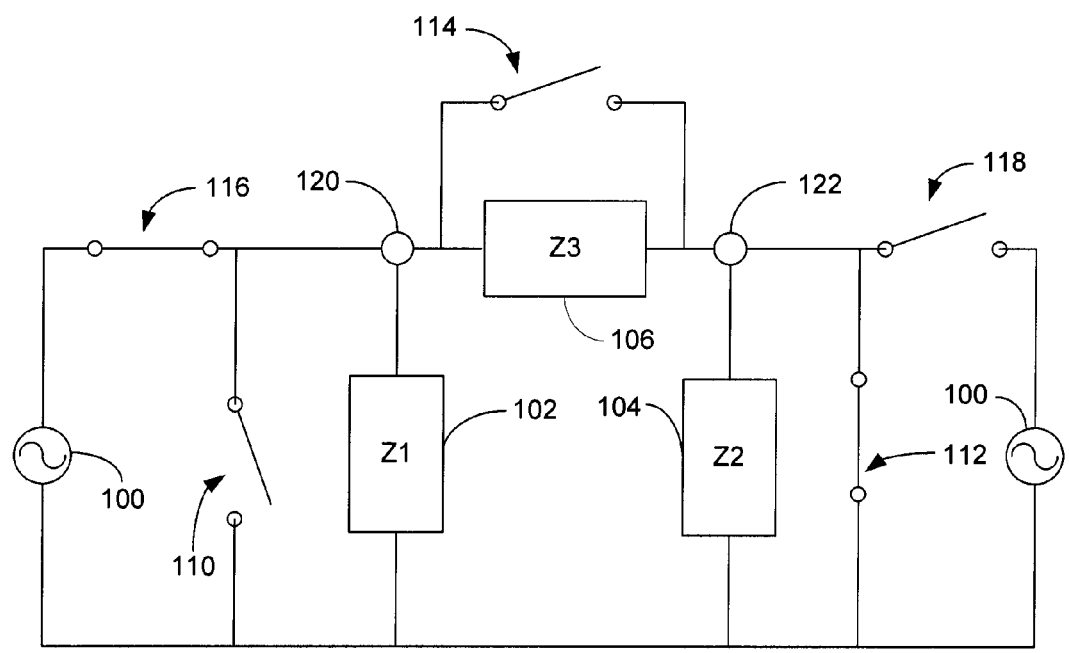
Figure 3A:
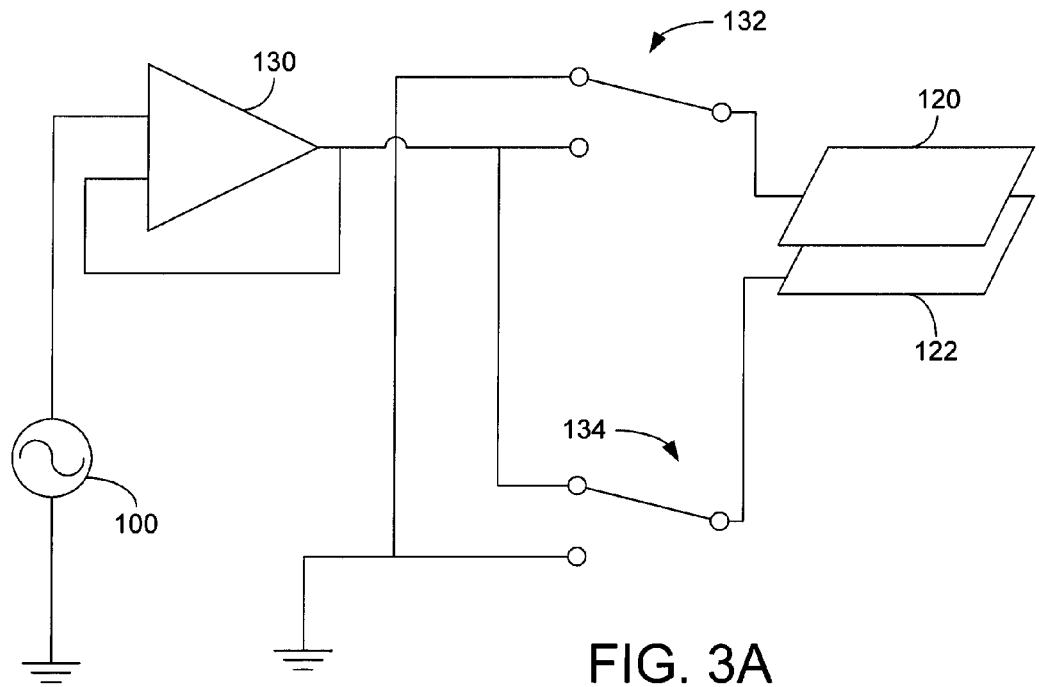
FIGS. 3A-B are circuit diagrams of the sensing system of FIG. 1B when taking a second measurement, according to an exemplary embodiment.
Figure 3B:
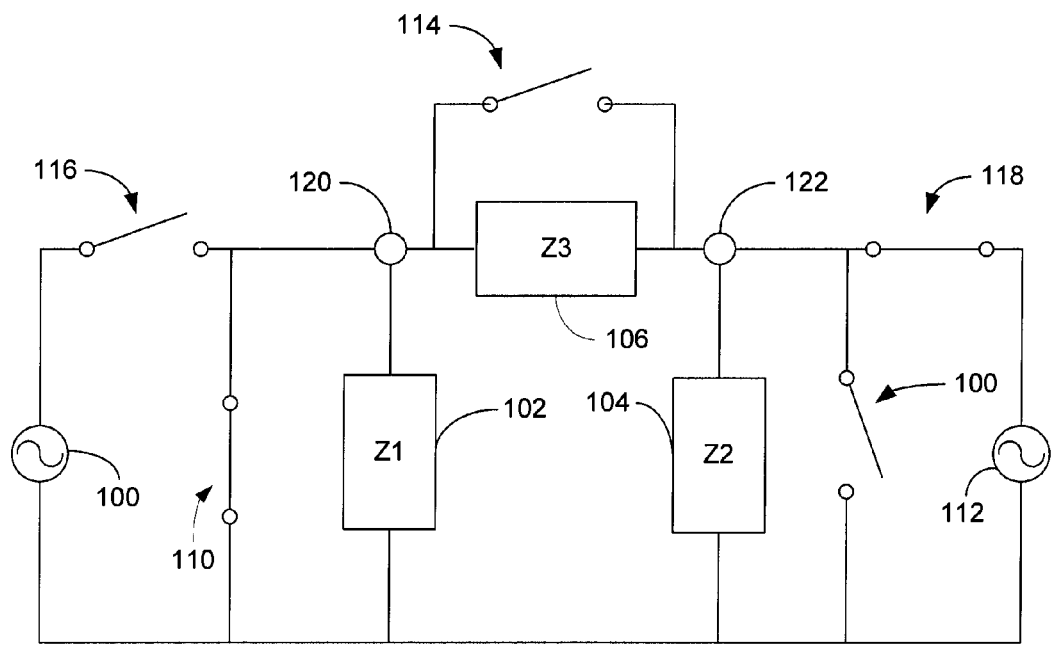
Figure 4A:
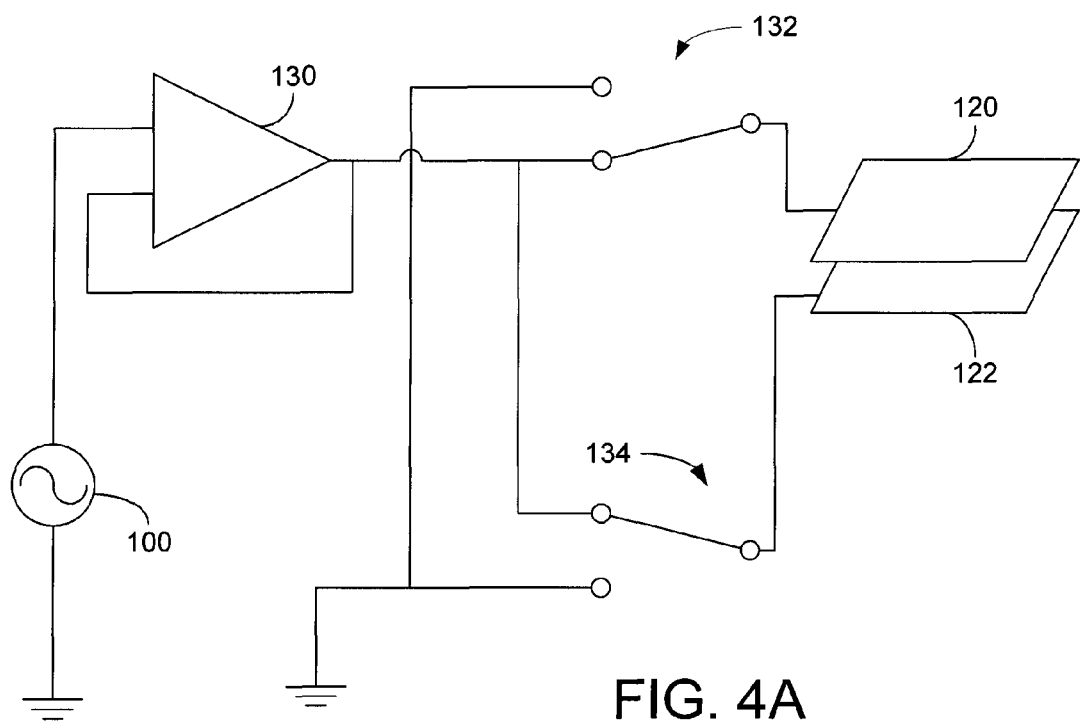
FIGS. 4A-B are circuit diagrams of the sensing system of FIG. 1B when taking a third measurement, according to an exemplary embodiment.
Figure 4B:
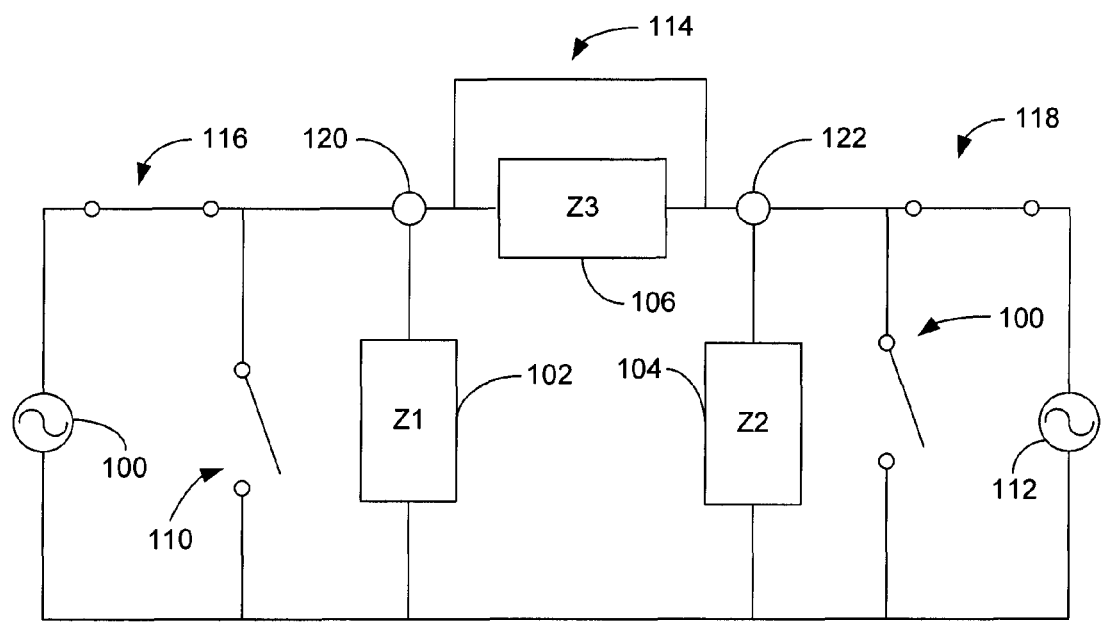

Referring specifically to FIGS. 2A-4B, circuit diagrams and the states of the switches are shown for each of the three measurements described in FIG. 1B, according to an exemplary embodiment. FIGS. 2A-B correspond to a measurement of the current from the sensor 120, including the current flowing between the sensor 120 and the shield 122 and from the sensor 120 to ground. FIGS. 3A-B correspond to a measurement of the current from the shield 122, including the current flowing between the shield 122 and the sensor 120 and from the shield 122 to ground. FIGS. 4A-B correspond to a measurement of the current from the sensor 120 and the shield 122 to ground; there is no current between the sensor 120 and the shield 122. Using the circuits of FIGS. 2A-4B, calculations (e.g., the calculations shown in equations (2)-(5) above) are used to identify the impedance from the sensor 120 to ground, not including the impedance from the sensor 120 to the shield 122. The calculations result in solving three equations with three unknown values.

Referring to FIGS. 5A-11B, the method of using three equations and three unknown values (as shown in FIGS. 2A-4B for Z1, Z2, and Z3) may be improved by measuring the source impedance through the LCA 130. The current for each impedance measurement (e.g., the measurements of equations (2)-(4) above) are demodulated (e.g., the first impedance, second impedance, and third impedance measurements are demodulated). Additionally, the source impedance 160 to the sensor 120 (Zs1) and the source impedance 162 to the shield 122 (Zs2) are measured and demodulated. The calculated values are then normalized and the three equations and three unknowns technique is used to solve for the current from the sensor 120 to ground 126. The current is then used to determine the impedance from the sensor 120 to ground 126.

The circuit diagrams of FIGS. 5A-11A include two reference impedances 150, 152. Current measurements are made with a combination of reference impedances 150, 152 switched to ground and the sensor switched out. The reference impedance 150, 152 measurements are used in a normalization calculation to identify the absolute level of the impedances even if the LCA 130 gain and offset have some variation.

The measurements may be made in seven steps as shown in FIGS. 5A-11B. Referring specifically to FIGS. 5A-B, circuit diagrams and the states of the switches are shown configured for measuring the sensor source impedance 160 (Zs1). Referring to FIGS. 6A-B, circuit diagrams and the states of the switches are shown configured for measuring the sensor shield impedance 162 (Zs2). The measurements of FIGS. 5A-6B may be done by grounding the sensor 120 for measuring the source impedance 160 at the sensor 120 and grounding the shield 122 for measuring the source impedance 162 at the shield 122.

Figure 9A:
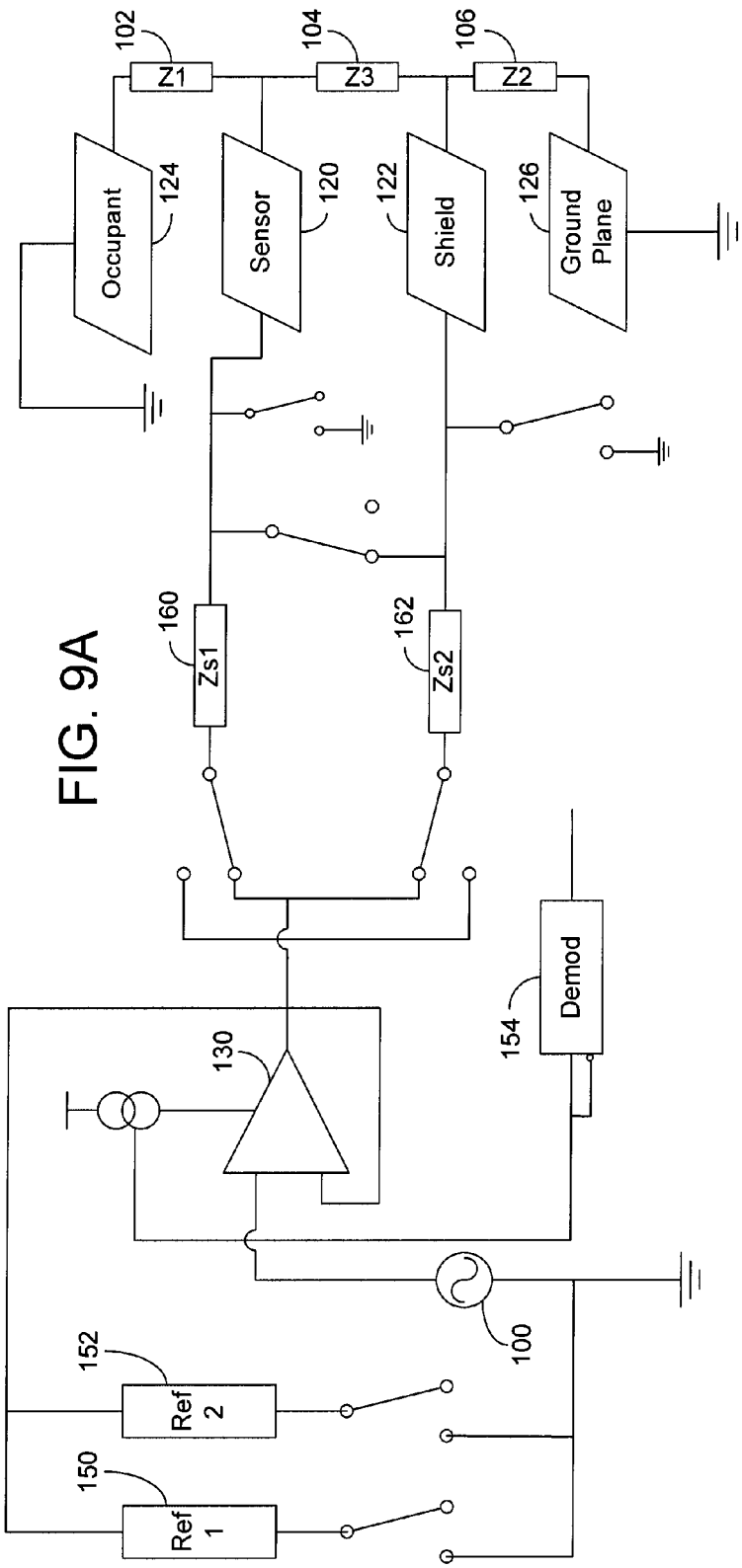
FIGS. 9A-B are circuit diagrams of the sensing system of FIG. 1B when measuring an impedance from sensor to shield, according to an exemplary embodiment.
Figure 9B:
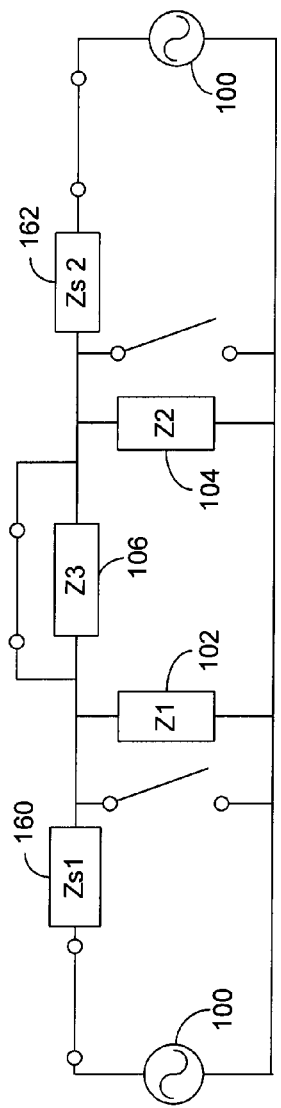

Referring to FIGS. 7A-B, circuit diagrams and the states of the switches are shown configured for measuring the impedance 102 (Z1) in parallel with the impedance 106 (Z3) (e.g., measurement (2) of FIG. 1B). Referring to FIGS. 8A-B, circuit diagrams and the states of the switches are shown configured for measuring the impedance 104 (Z2) in parallel with the impedance 106 (Z3) (e.g., measurement (3) of FIG. 1B). Referring to FIGS. 9A-B, circuit diagrams and the states of the switches are shown configured for measuring the impedance 102 (Z1) in parallel with the impedance 104 (Z2) (e.g., measurement (4) of FIG. 1B). Referring to FIGS. 10A-B, circuit diagrams and the states of the switches are shown configured for measuring the value at a reference impedance 150 (Ref 1), and referring to FIGS. 11A-B, circuit diagrams and the states of the switches are shown configured for measuring the value at a reference impedance 152 (Ref 2). For the measurements of the reference impedances 150 and 152 in FIGS. 10A-11B, the current source 100 is disconnected from the sensor 120 and the determined impedance from the sensor 120 to ground is also based on the measured source impedances and reference impedances of FIGS. 5A-11B.

Figure 12:
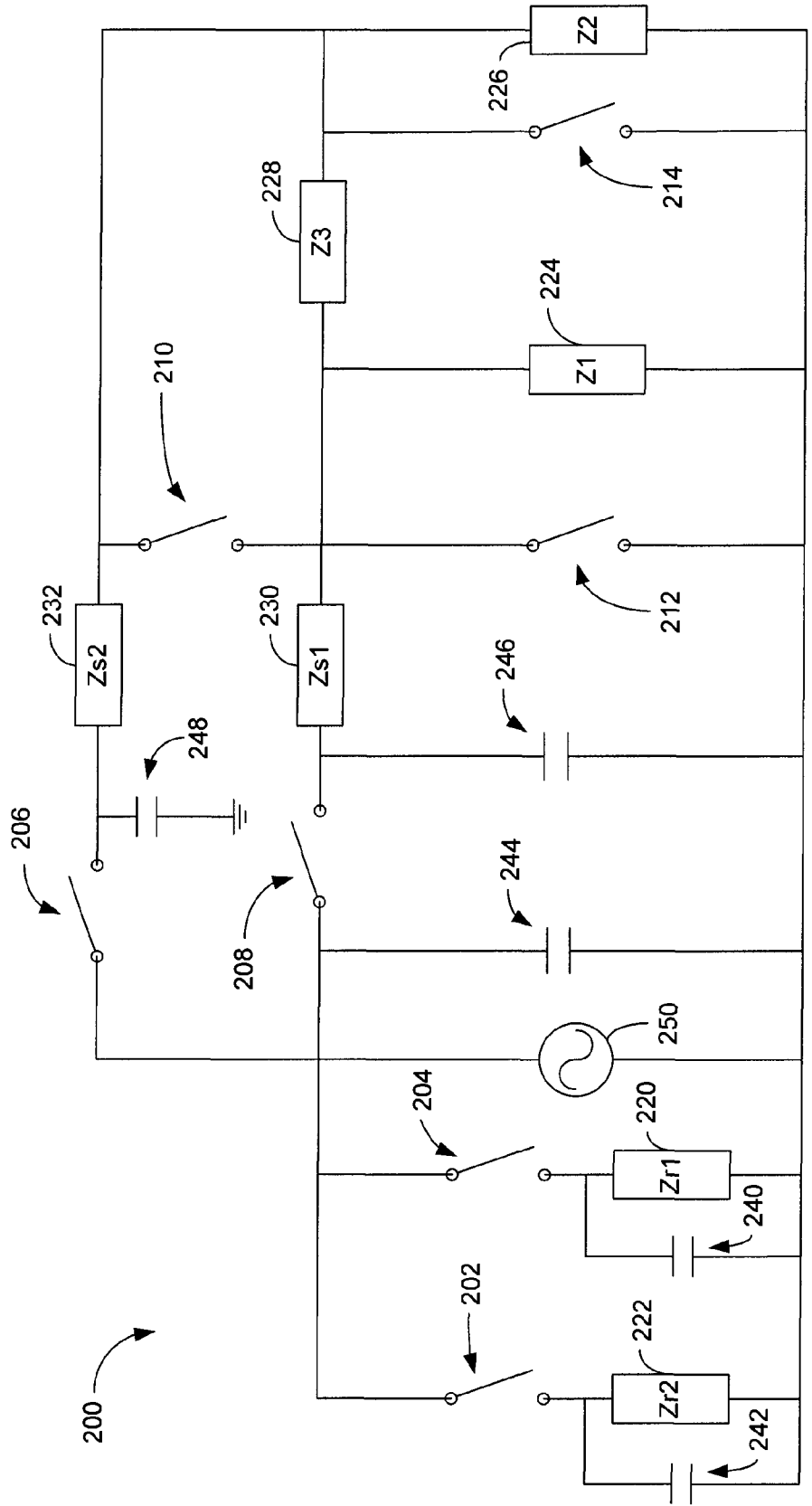
FIG. 12 is an equivalent circuit with impedance switches for conducting the steps or measurements shown in FIGS. 5A-11B, according to an exemplary embodiment.
Figure 13:
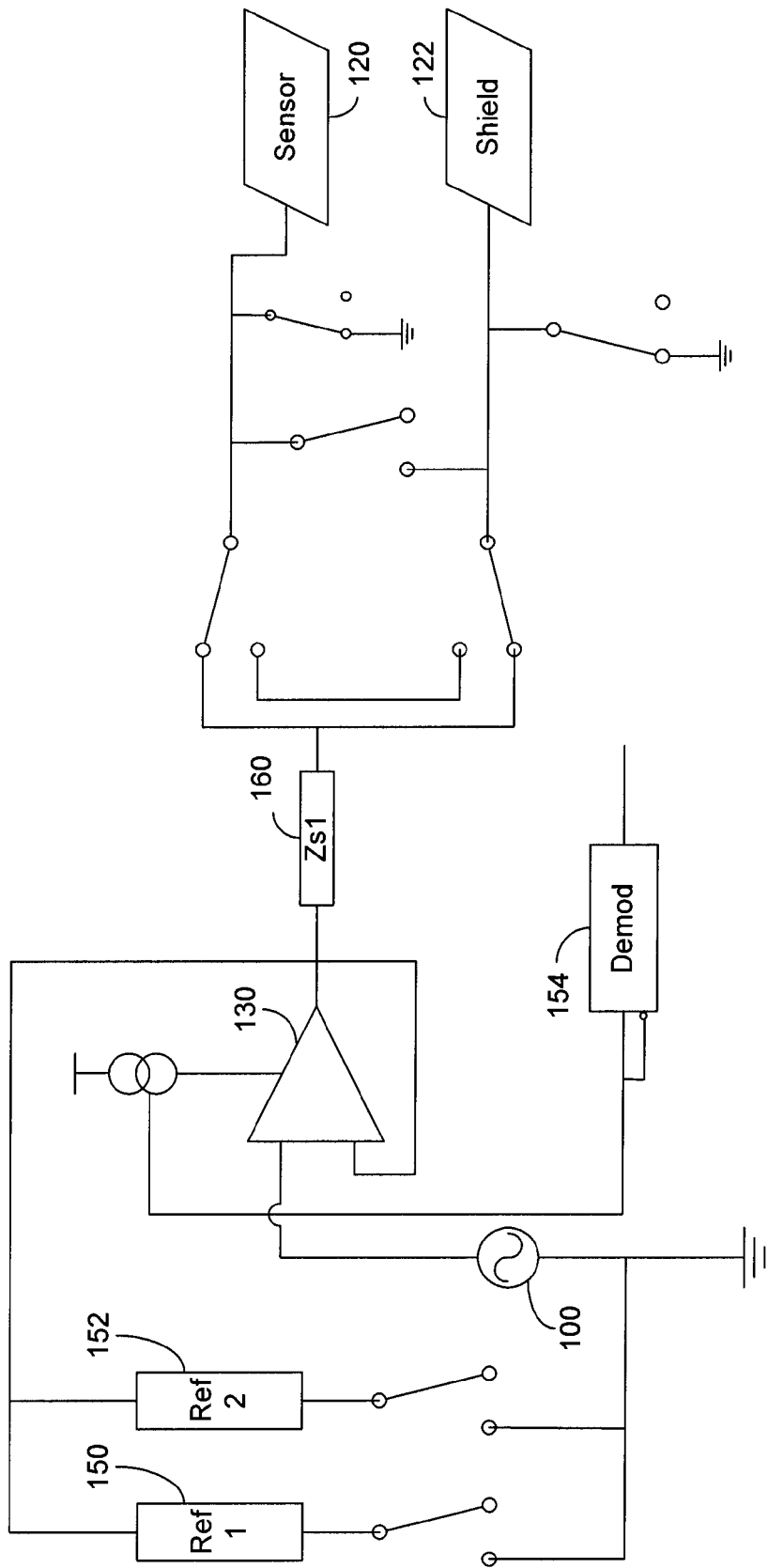
FIGS. 13-18 are circuit diagrams of the sensing system of FIG. 1B when taking a sequence of six measurements, according to another exemplary embodiment.
Figure 14:
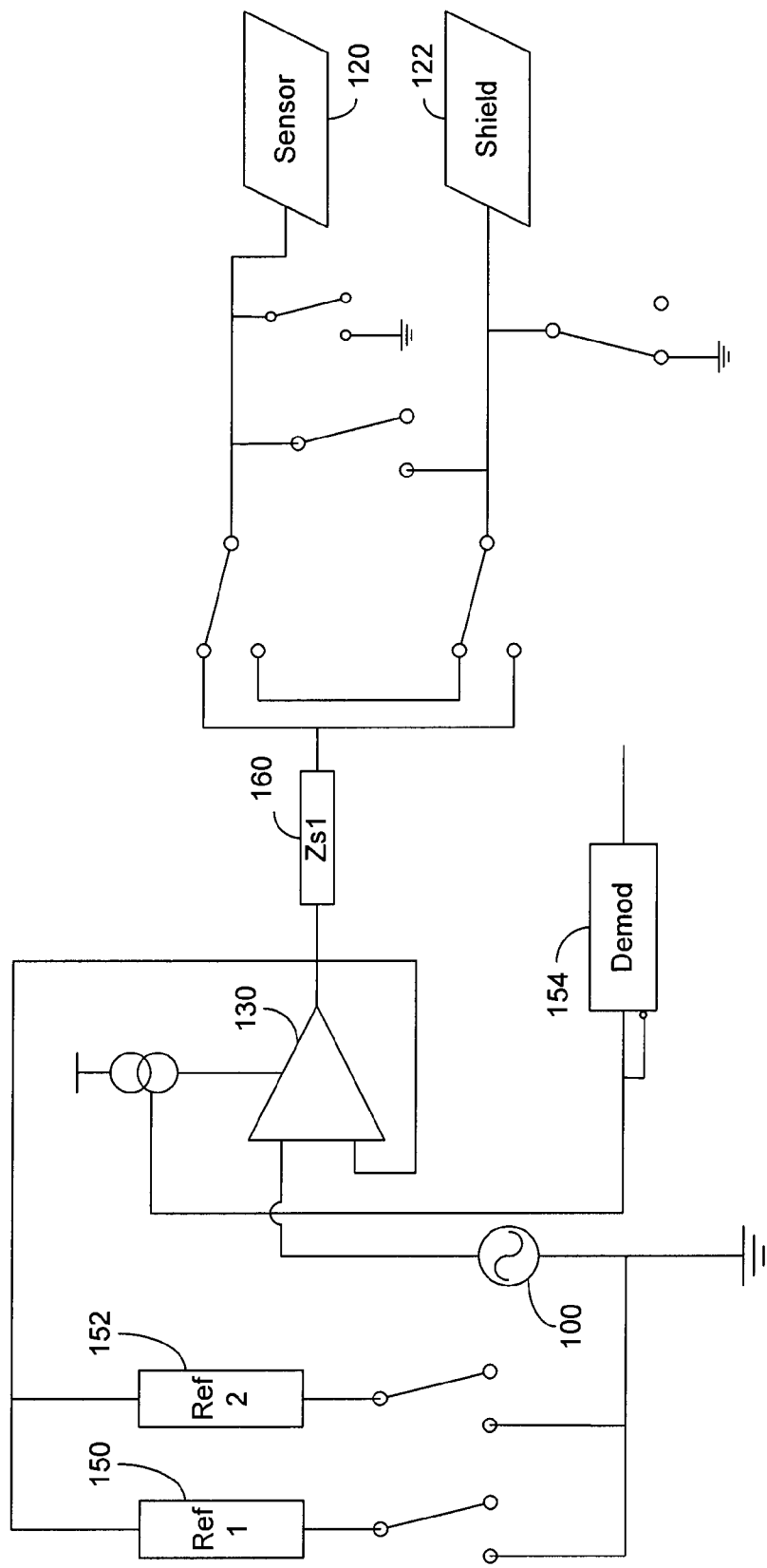
Figure 15:
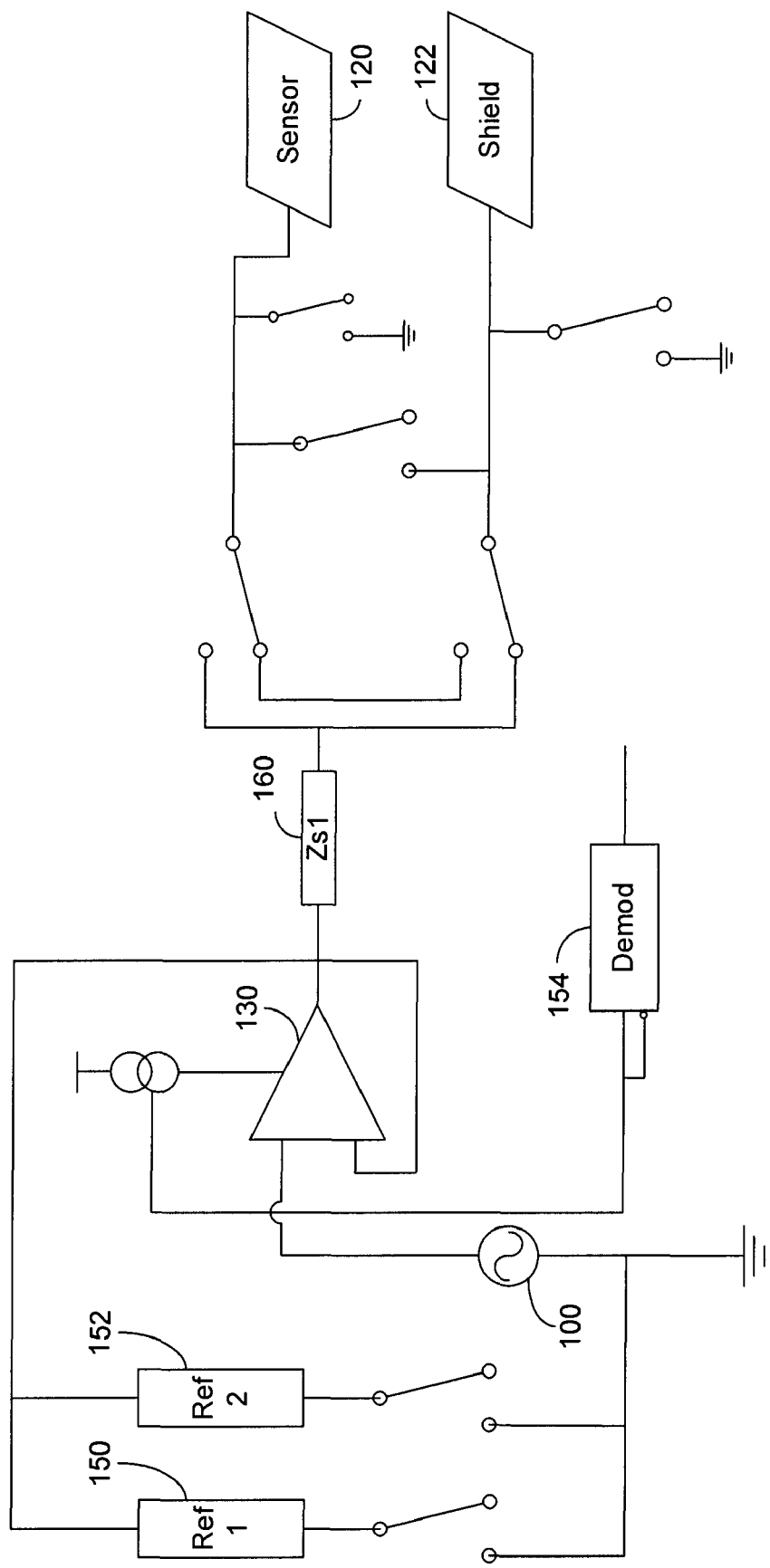
Figure 16:
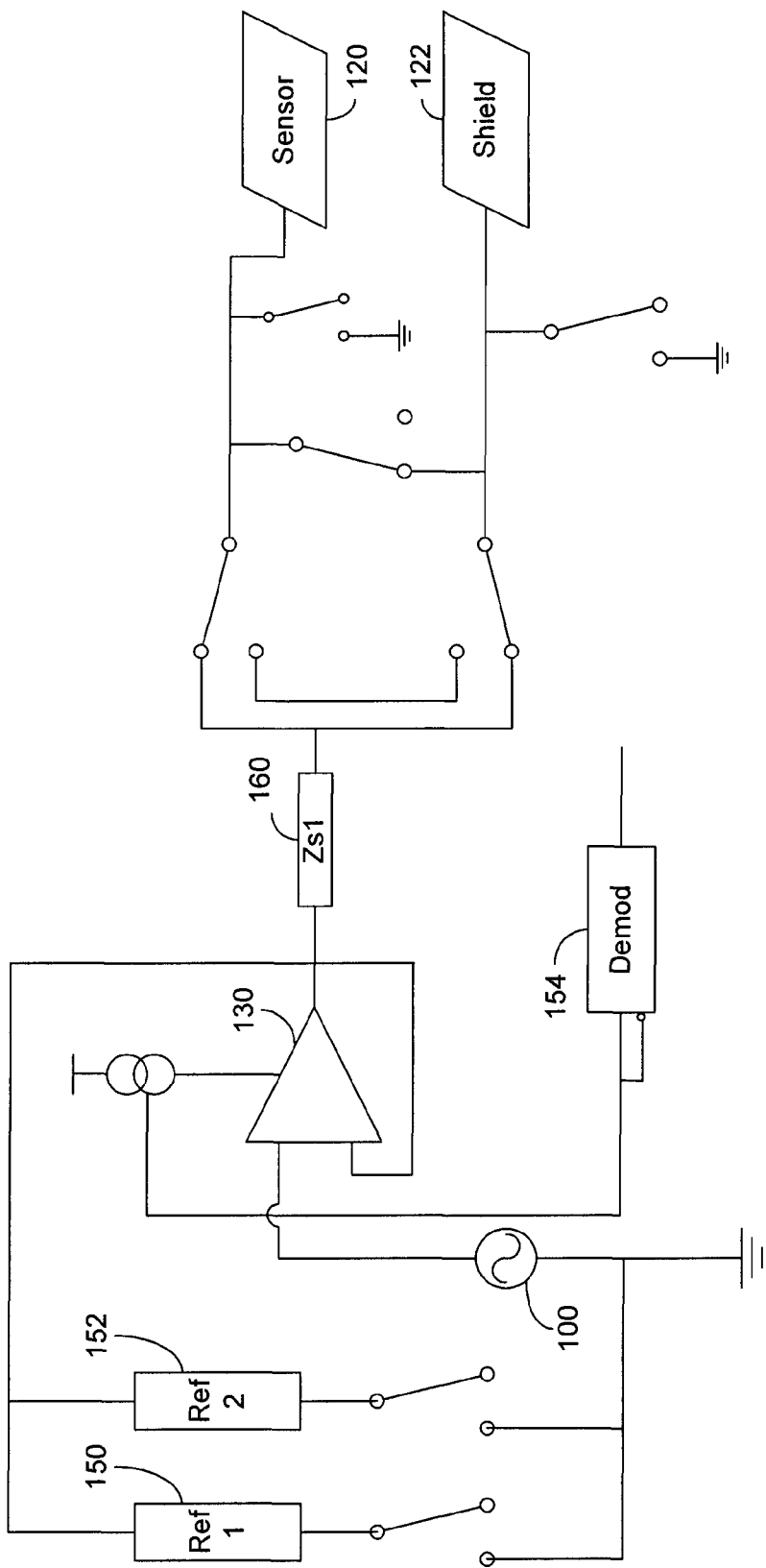
Figure 17:
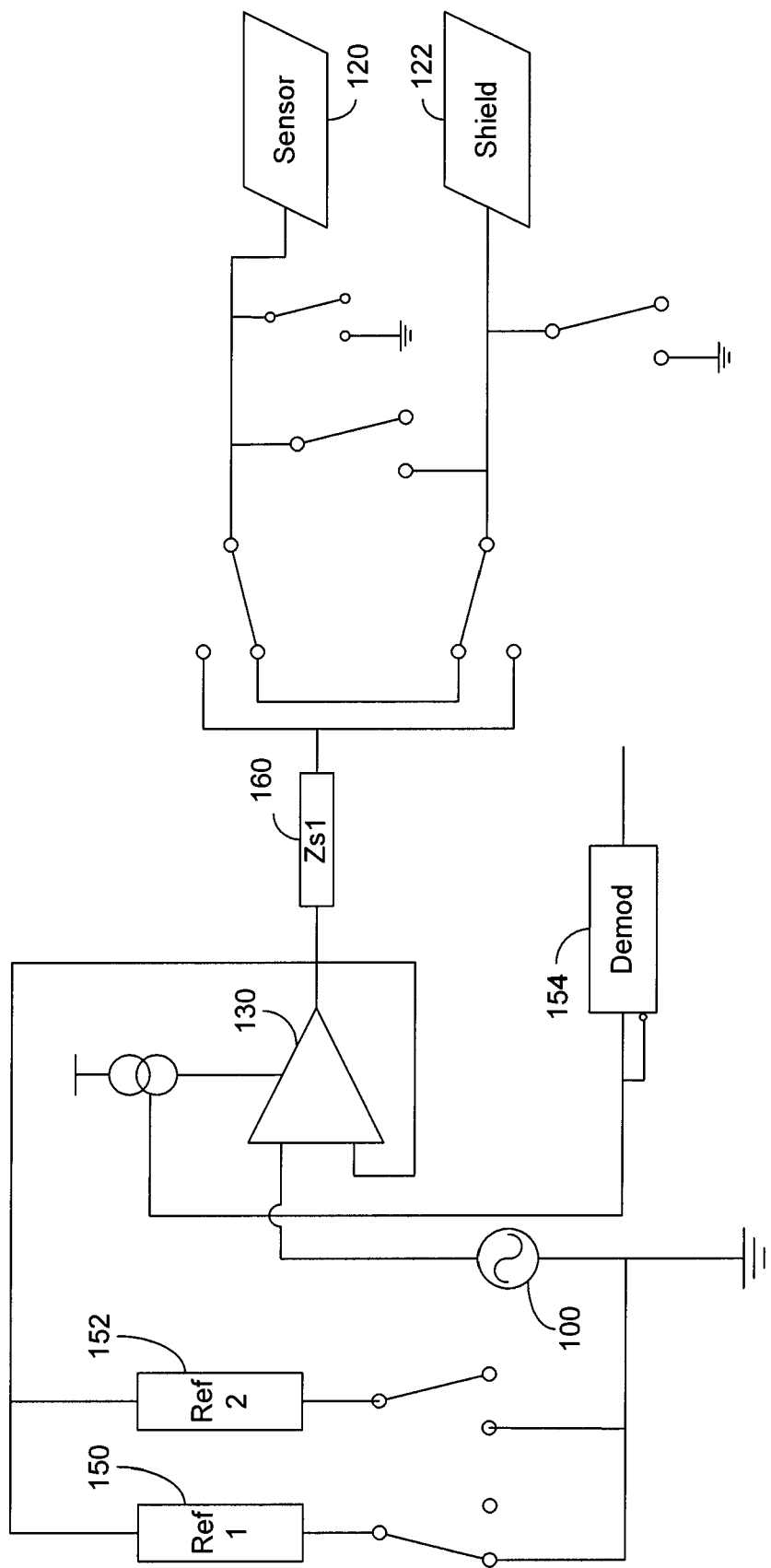
Figure 18:
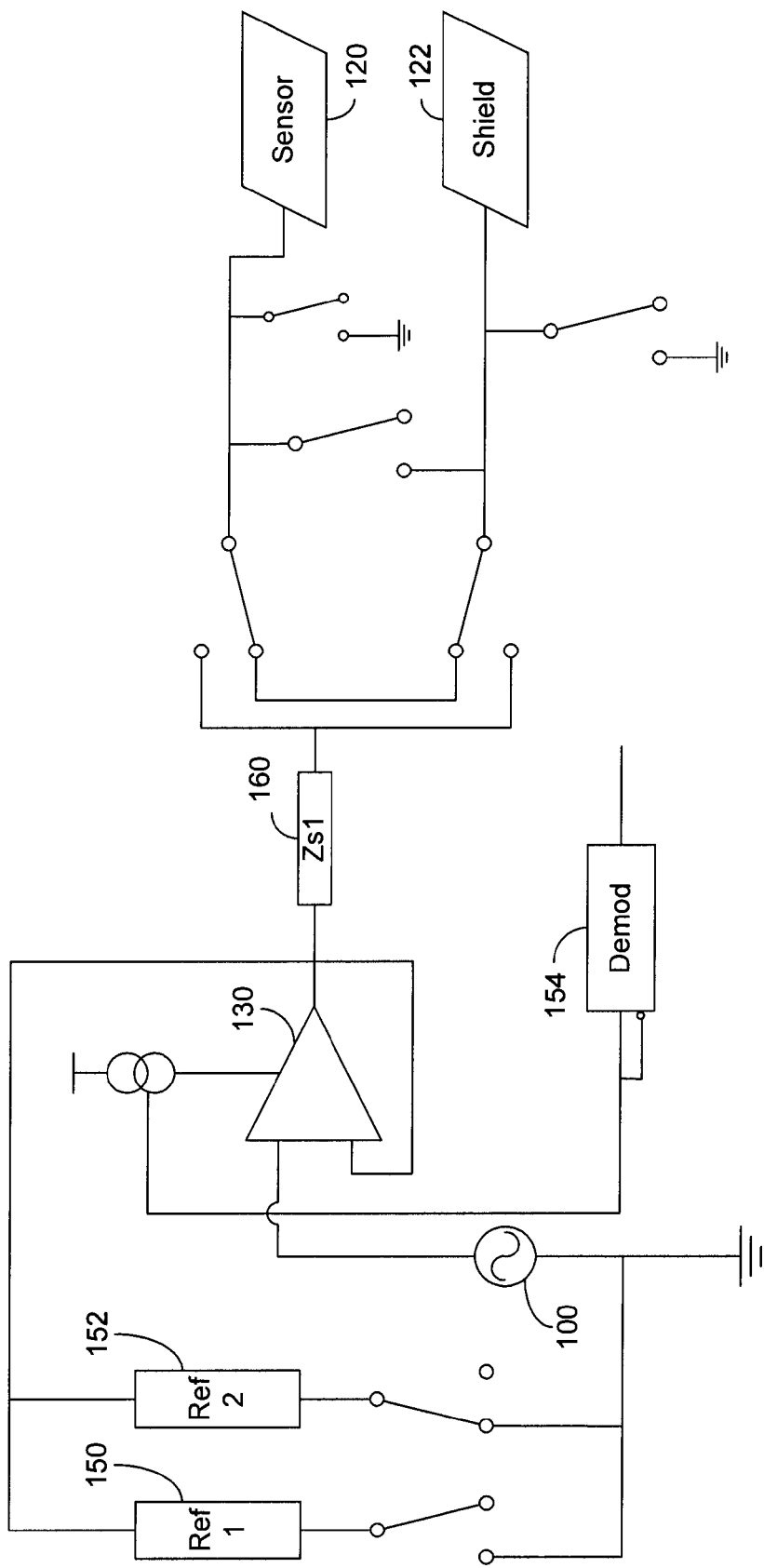

Referring now to FIG. 12, an equivalent circuit 200 with impedance switches for conducting the steps or measurements as shown in FIGS. 5A-11B is shown, according to an exemplary embodiment. The circuit 200 is calculated for each of the seven measurements shown in FIGS. 5A-11B. The circuit 200 generally includes switches 202-214 that may generally correspond with the switches of FIGS. 1-11. The circuit 200 further includes impedances 220-232 (e.g., impedances 220-222 (Zr1, Zr2) representing the impedances 150, 152 of FIGS. 5-11, impedances 224-228 (Z1-Z3) representing the impedances 102-106 of FIGS. 1-11, and impedances 230-232 (Zs1, Zs2) representing the impedances 160, 162 of FIGS. 5-11). The circuit 200 further includes capacitors 240-248 (parasitic capacitance 240 (Cr1) for the impedance 220, a parasitic capacitance 242 (Cr2) for the impedance 222, a LCA parasitic capacitance 244 (CLCA), a sensor parasitic capacitance 246 (Cs1), and a shield parasitic capacitance 248 (Cs2)).

The three measurement technique may then be applied to the calculated currents (assuming no knowledge of the parasitic capacitances). Calculations including more than three measurements may be performed in a similar fashion to the three measurement method. According to an exemplary embodiments, the outputs of the circuit 200 are given in the table below for various circuit parameters:

| ZR1 | 100 pF | 100 pF | 100 pF | 100 pF | 100 pF |
|---|---|---|---|---|---|
| ZR2 | 200 pF | 200 pF | 200 pF | 200 pF | 200 pF |
| ZS1 | 2k + 100 nF + 50 µH | 2k + 100 nF + 50 µH | 2k + 100 nF + 50 µH | 2k + 100 nF + 50 µH | 2k + 100 nF + 50 µH |
| ZS2 | 2k + 100 nF + 50 µH | 2k + 100 nF + 50 µH | 2k + 100 nF + 50 µH | 2k + 100 nF + 50 µH | 2k + 100 nF + 50 µH |
| Z1 | 50 pF | 50 pF | 50 pF | 50 pF | 50 pF |
| Z2 | 80 pF | 150 pF | 300 pF | 80 pF | 150 pF |
| Z3 | 80 pF | 150 pF | 300 pF | 80 pF | 150 pF |
| CR1 | 0.001 pF | 0.001 pF | 0.001 pF | 35 pF | 35 pF |
| CR2 | 0.001 pF | 0.001 pF | 0.001 pF | 35 pF | 35 pF |
| CS1 | 0.001 pF | 0.001 pF | 0.001 pF | 50 pF | 20 pF |
| CS2 | 0.001 pF | 0.001 pF | 0.001 pF | 50 pF | 20 pF |
| CLCA | 0.001 pF | 0.001 pF | 0.001 pF | 50 pF | 50 pF |
| Z1(calc) | 50 pF | 50 pF | 50 pF | 52.4 pF‖−1.66 M | 52.2 pF‖−638k |

Referring specifically to FIGS. 13-18, according to another exemplary embodiment, the measurements may be made in six steps. In the embodiment of FIGS. 13-18, the sensor 120 and shield 122 is grounded for measuring a source impedance 160 and a current source may be disconnected from the sensor 120 to measure the two reference impedances 150 and 152. The steps include measuring the sensor source impedance 160 (shown in FIG. 13), measuring Z1 in parallel with Z3 (shown in FIG. 14), measuring Z2 in parallel with Z3 (shown in FIG. 15), measuring Z1 in parallel with Z2 (shown in FIG. 16), measuring the reference impedance 150 (shown in FIG. 17), and measuring the reference impedance 152 (shown in FIG. 18). Referring also to FIGS. 5A-11B, variations between the impedances 160, 162 (Zs1 and Zs2) may be eliminated by communizing the parameters into a single impedance 160 (Zs1) as shown in FIGS. 13-18. The current for each measurement (the sensor measurement, shield measurement, sensor/shield measurement, and single source impedance 160 to the sensor) are demodulated. These values are then normalized and the three equations and three unknowns technique is used to solve for the current from the sensor to ground. Multi measurement calculation would be done in a similar fashion to the three measurement method.

Figure 19:
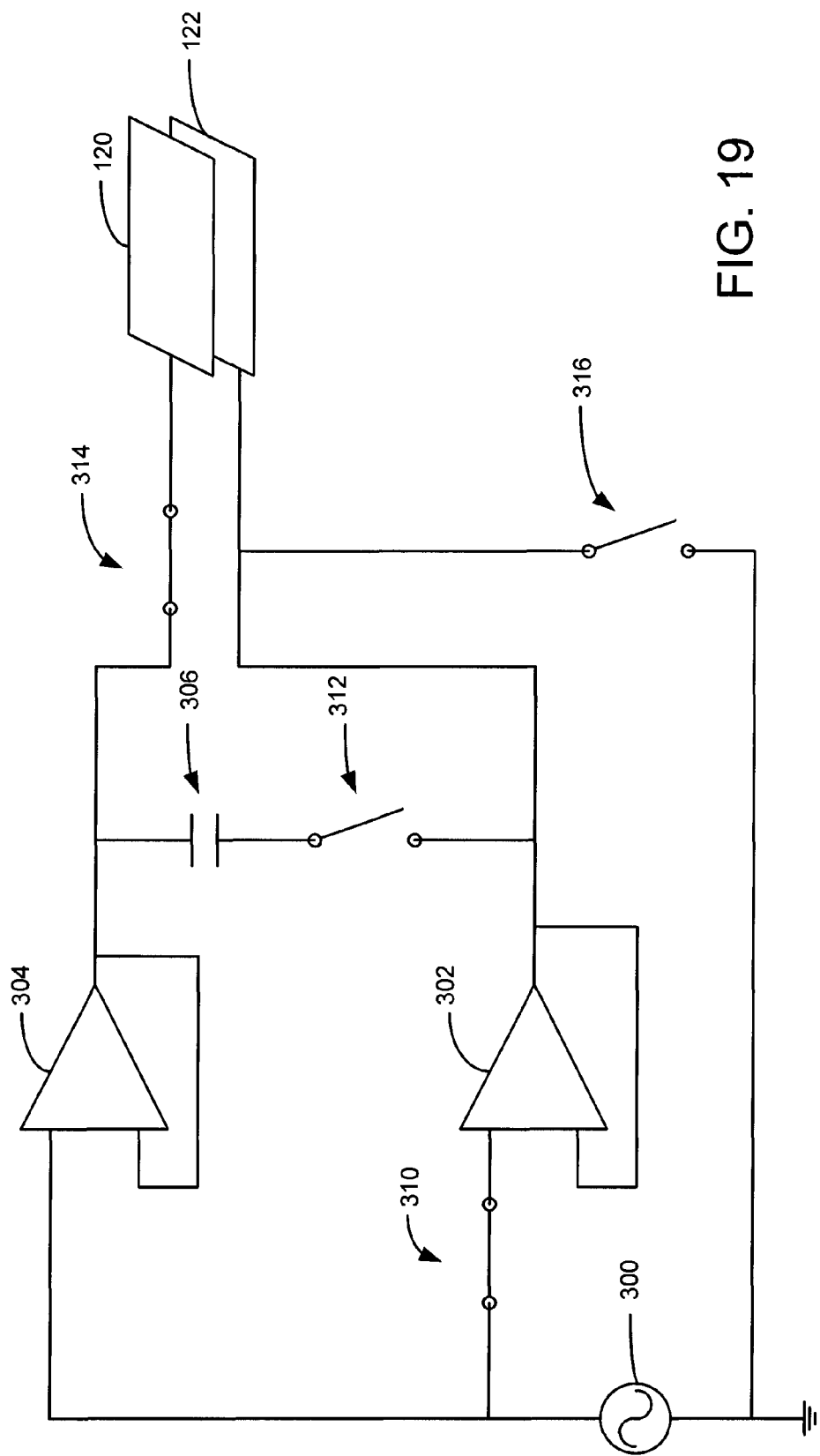
FIGS. 19-21 are circuit diagrams of the sensing system of FIG. 1B when taking a sequence of three measurements, according to another exemplary embodiment.
Figure 20:
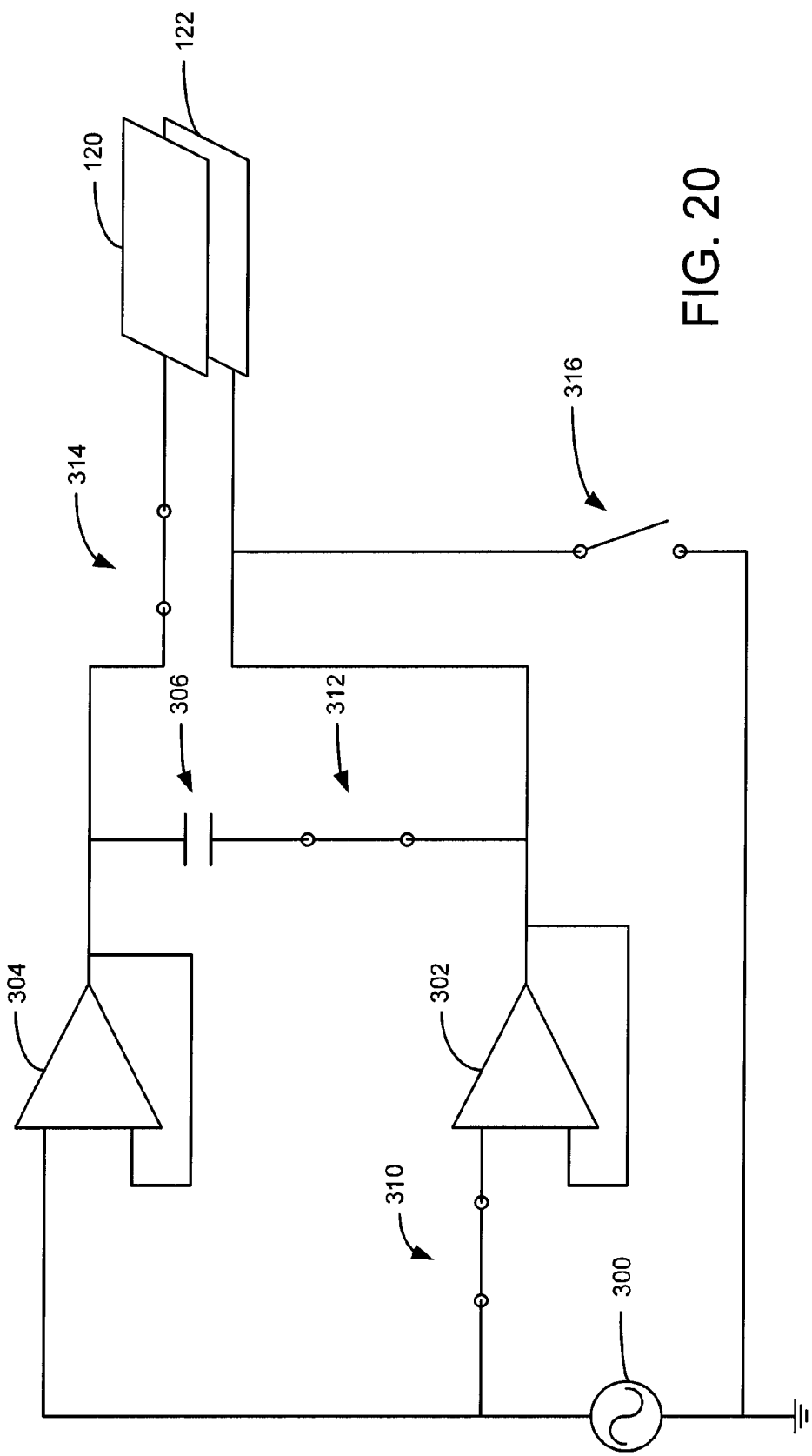
Figure 21:
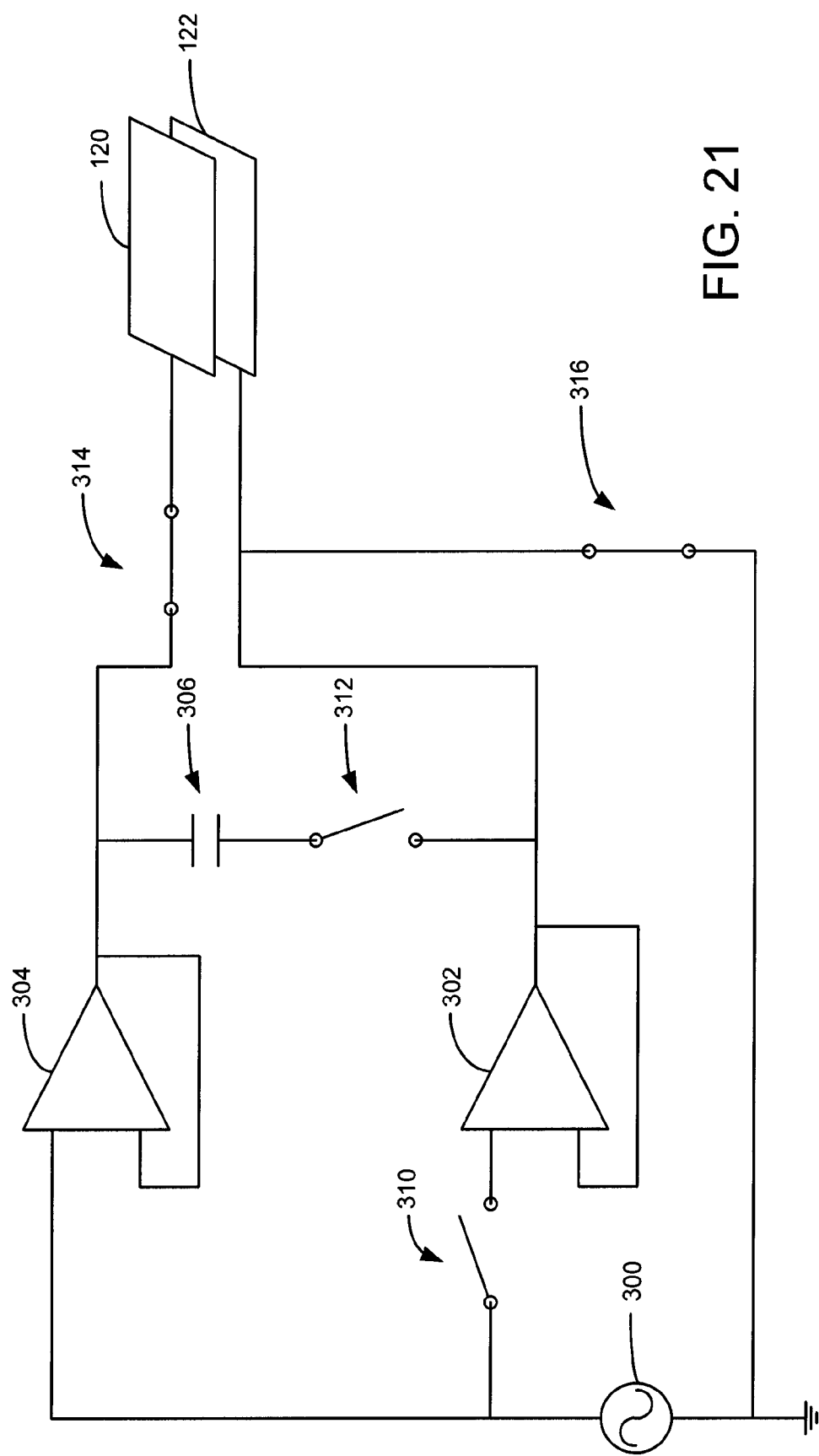
Figure 22:
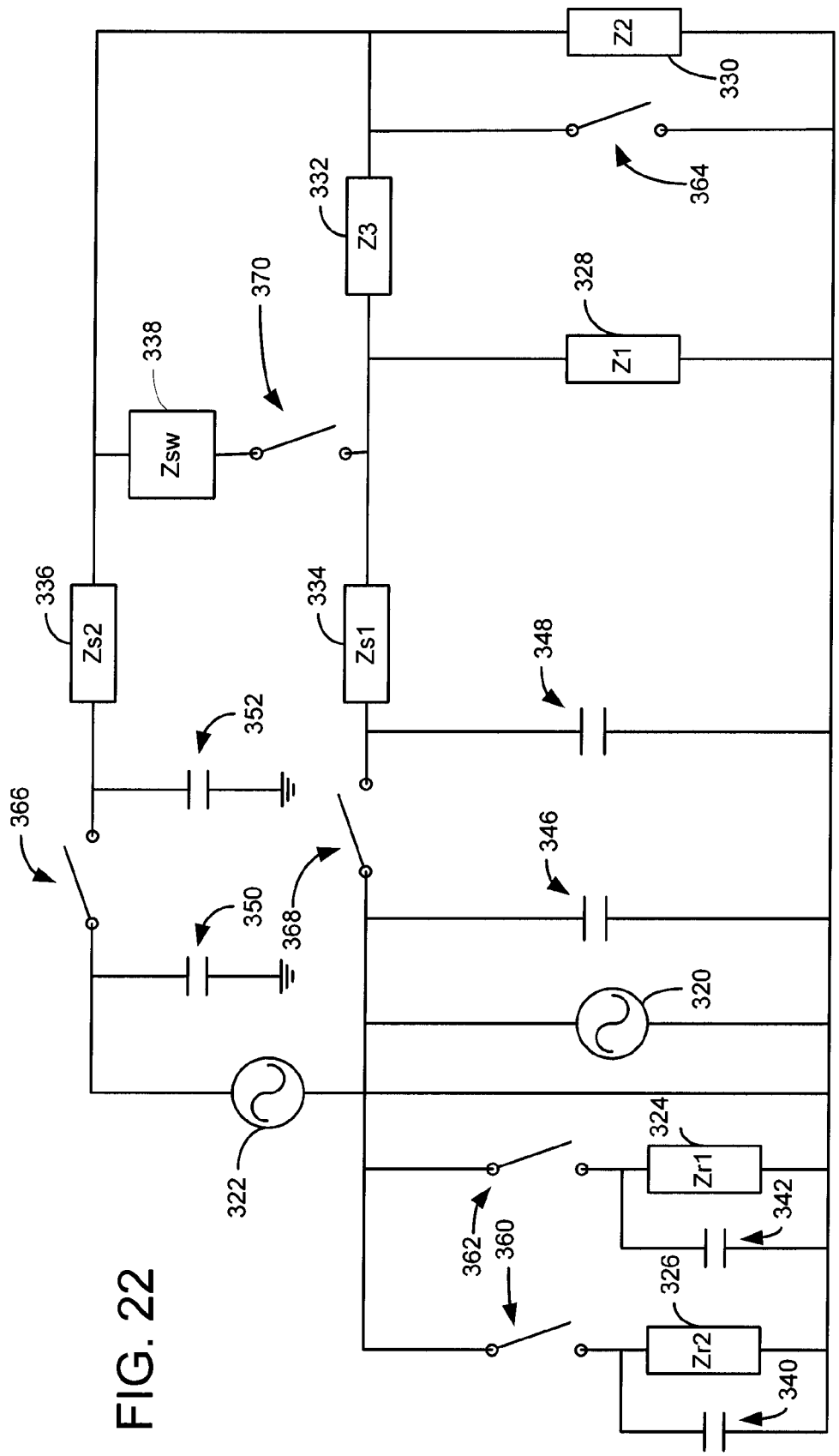
FIG. 22 is a circuit diagram of an equivalent circuit of the measurement method of FIGS. 19-21 when taking the various measurements, according to an exemplary embodiment.

Referring specifically to FIGS. 19-22, according to another exemplary embodiment, a multi-measurement method that utilizes a driven shield for the shield 122 includes switching in a known impedance between the driven shield and the LCA to compensate for an imperfect driven shield signal. Referring generally to FIGS. 19-21, a circuit is shown with a voltage source 300, LCAs 302-304, a capacitor 306, and switches 310-316 along with a sensor 120 and a shield 122. Three equations with three unknowns are obtained by measuring a normal sensor reading with a driven shield (measurement M1, measured for the circuit shown in FIG. 19), the same measurement as M1 but with the known capacitance switched in parallel with the sensor and shield (measurement M2, measured for the circuit shown in FIG. 20), and the same measurement as M1 but with the shield grounded (measurement M3, measured for the circuit shown in FIG. 21). These values are then normalized and the three equations and three unknowns technique is used to solve for the current from the sensor to ground. FIG. 22 illustrates an equivalent circuit with the impedance switches for conducting the steps or measurements. The circuit of FIG. 22 includes sources 320, 322; impedances 324-338, capacitors 340-352; and switches 360-370. The calculations used to solve for M4, M5, M6, and Z1 (the impedance 328 of the circuit of FIG. 22) include:

$$M4 = \frac{1}{Z1} + \frac{1-Vds}{Z3} \quad (6)$$

$$M5 = \frac{1}{Z1} + \frac{1-Vds}{Z3+Zsw} \quad (7)$$

$$M6 = \frac{1}{Z1+Z3} \quad (8)$$

$$Z1 = 1/(2 \cdot [(-M6) \cdot M5 + M6 \cdot M4]) \cdot \quad (9)$$
$$[M4^2 - 2 \cdot M4 \cdot M6 \cdot M5 \cdot Zsw + M6^2 \cdot M5^2 \cdot Zsw^2 - 4 \cdot M6^2 \cdot Zsw \cdot M5 + 4 \cdot M6^2 \cdot Zsw \cdot M4)]^{\frac{1}{2}}$$

where Vds is the voltage of the voltage source 322 and Zsw is the impedance 338 of FIG. 22. The third impedance measurement M6 may be done by electrically coupling the sensor and shield together and additionally coupling the known impedance in parallel with the sensor and shield.

According to another exemplary embodiment, a system may vary the amplitude of the shield signal and include a switched load 306 between the sensor 120 and the shield 122 as in FIG. 19. Measurements in four configurations may be made:

1) Shield signal level A with switched load out
2) Shield signal level A with switched load in
3) Shield signal level B with switched load out, and
4) Shield signal level B with switched load in.

The shield signal may be varied in amplitude using a voltage divider on the input of the buffer amplifier 302. These measurements are then used in a calculation to derive the impedance from the sensor 120 to ground, independent of the impedance from the sensor 120 to the shield 122. This exemplary embodiment does not require switch 316.

The exemplary embodiments of the figures use a shield and reduce or eliminate the measurement variation caused by the spacer thickness or spacer material properties. Advantageously, a shield may be used and the spacer between the sensor and the shield may change characteristics without affecting the final measurement used for the occupant classification. This allows for a system that is more robust than a system that does not automatically adjust for spacer characteristic variations. This also opens up the sensor design to options that include more flexible spacer materials, allowing for sensing system advantages in terms of seat comfort and system cost. For example, a thinner sensor pad may allow for easier installation and better comfort, more flexible sensor materials may reduce any influence on seat comfort, spacer materials may be at a lower cost, the system may have good shielding without a driven shield, and the system may detect impedance below the sensor (e.g., wet seat detection).

It is noted that according to other exemplary embodiments, the sensing system is not restricted to a sensor and shield that are in the shape of large flat electrodes. For example, the shield could be a shield conductor around a harness wire connection with the sensor leads inside the shield. The shield may also be an electrode around the outside of the sensor electrode in the plane of the sensor, or a continuation of the shield so that the shield is a larger area than the sensor. In other configurations, the shield may be a node on a circuit board.

Although the sensing system is illustrated as including multiple features utilized in conjunction with one another, the sensing system may alternatively utilize more or less than all of the noted mechanisms or features. For example, in other exemplary embodiments, there may be more or fewer than the illustrated reference voltages.

Although specific shapes of each element have been set forth in the drawings, each element may be of any other shape that facilitates the function to be performed by that element. For example, the sensor, shield, occupant, and ground planes have been shown as a flat plate, however, in other exemplary embodiments the structure may define that of one or more wires, coils, or electronic components of any shape.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. An occupant sensing system for a seat, comprising:
    a sensing electrode configured to generate an electric field when power is supplied to the electrode;
    a shield electrode configured to form a layer parallel to the sensing electrode, the shield layer configured to reduce the electromagnetic influence of electric fields generated by objects located outside of the electric field; and
    a circuit coupled to the sensing electrode and configured to sense a change in the electric field caused by an occupancy state of the seat, the circuit further configured to ground the shield layer for measuring a first impedance at the sensing electrode, to ground the sensing electrode for measuring a second impedance at the shield layer, to electrically couple the sensing electrode and shield electrode together for measuring a third impedance at the sensing electrode and shield electrode, and to determine the impedance from the sensing electrode to ground based on the first, second, and third impedances,
    wherein the determined impedance from the sensing electrode to ground does not include an impedance from the sensing electrode to the shield layer.

2. The occupant sensing system of claim 1, wherein the first impedance comprises an inverse sum of the impedance from the sensing electrode to ground and the impedance from the sensing electrode to the shield electrode.

3. The occupant sensing system of claim 1, wherein the second impedance comprises an inverse sum of the impedance from the shield electrode to ground and the impedance from the shield electrode to the sensing electrode.

4. The occupant sensing system of claim 1, wherein the third impedance comprises an inverse sum of the impedance from the sensing electrode to ground and the impedance from the shield electrode to ground.

5. The occupant sensing system of claim 1, wherein the first impedance comprises an inverse sum of the impedance from the sensing electrode to ground and the impedance from the sensing electrode to the shield layer, the second impedance comprises an inverse sum of the impedance from the shield layer to ground and the impedance from the shield electrode to the sensing electrode, and the third impedance comprises an inverse sum of the impedance from the sensing electrode to ground and the impedance from the shield electrode to ground.

6. The occupant sensing system of claim 1, wherein the circuit demodulates a current for each of the first, second, and third impedances and a current for at least one source impedance between the sensing electrode and a current source and the shield electrode and the current source, the circuit normalizing the demodulated current values and determining a current from the sensing electrode to ground based on the normalized current values, the circuit determining the impedance from the sensing electrode to ground based on the determined current from the sensing electrode to ground.

7. The occupant sensing system of claim 1, wherein the circuit is further configured to ground the sensing electrode for measuring a source impedance at the sensing electrode, to ground the shield electrode for measuring a source impedance at the shield electrode, and to disconnect a current source from the sensing electrode for measuring first and second reference impedances, wherein the determined impedance from the sensing electrode to ground is also based on the measured source impedances and reference impedances.

8. The occupant sensing system of claim 1, wherein the circuit is further configured to ground the sensing electrode and shield layer for measuring a source impedance, and to disconnect a current source from the sensing electrode for measuring first and second reference impedances, wherein the determined impedance from the sensing electrode to ground is also based on the measured source impedance and reference impedances.

9. The occupant sensing system of claim 1, wherein the shield electrode comprises a driven shield, and wherein the circuit is further configured to electrically connect a known impedance between the driven shield and a load current amplifier to compensate for a driven shield signal.

10. The occupant sensing system of claim 9, wherein electrically coupling the sensing electrode and shield electrode together for measuring the third impedance further comprises electrically coupling the known impedance in parallel with the sensing electrode and shield electrode.

11. A method for measuring a change in capacitance at a vehicle sensor based on an impedance from the sensor to ground, comprising the steps of:
    generating an electric field at a capacitive sensing electrode, the electromagnetic influence of electric fields generated by objects located outside of the electric field being reduced by a shield layer parallel to the sensing electrode;
    grounding the shield layer and measuring a first impedance at the sensing electrode;
    grounding the sensing electrode and measuring a second impedance at the shield electrode;
    electrically coupling the sensing electrode and shield electrode together and measuring a third impedance at the sensing electrode/shield electrode; and
    determining the impedance from the sensing electrode to ground based on the first, second, and third impedances,
    wherein the determined impedance from the sensing electrode to ground does not include an impedance from the sensing electrode to the shield layer.

12. The method of claim 11, further comprising:
    demodulating a current for each of the first, second, and third impedances;
    demodulating a current for at least one source impedance between the sensing electrode and a current source and the shield electrode and the current source;
    normalizing the demodulated current values;
    determining a current from the sensing electrode to ground based on the normalized current values; and
    determining the impedance from the sensing electrode to ground based on the determined current from the sensing electrode to ground.

13. The method of claim 11, further comprising:
grounding the sensing electrode for measuring a source impedance at the sensing electrode;
grounding the shield electrode for measuring a source impedance at the shield electrode; and
disconnecting a current source from the sensing electrode and measuring first and second reference impedances,
wherein the determined impedance from the sensing electrode to ground is also based on the measured source impedances and reference impedances.

14. The method of claim 11, further comprising:
grounding the sensing electrode and shield layer for measuring a source impedance;
disconnecting a current source from the sensing electrode for measuring first and second reference impedances,
wherein the determined impedance from the sensing electrode to ground is also based on the measured source impedance and reference impedances.

15. The method of claim 11, further comprising:
electrically coupling a known impedance between the shield electrode and a load current amplifier, the shield layer comprising a driven shield; and
electrically coupling the known impedance in parallel with the sensing electrode and shield electrode when electrically coupling the sensing electrode and shield electrode together for measuring the third impedance.

16. A capacitive vehicle sensor, comprising:
a sensing electrode configured to generate an electric field;
a shield electrode configured to reduce the electromagnetic influence of electric fields generated by objects outside of the electric field;
a circuit coupled to the sensing electrode and shield electrode that allows a plurality of impedances to be coupled between the sensing electrode and the shield electrode; and
a control system that configures the impedances between the sensing electrode and the shield electrode, is configured to measure current to the sensing electrode in each configuration, and is configured to calculate a measure related to the impedance from the sensing electrode to ground.

17. The capacitive vehicle sensor of claim 16, wherein the calculated impedance from the sensing electrode to ground is used to classify an occupant of a vehicle seat.

18. An occupant sensing system for a seat, comprising:
a sensing electrode configured to generate an electric field when a signal is supplied to the electrode;
a shield electrode configured to form a layer parallel to the sensing electrode;
a circuit coupled to the sensing electrode and configured to sense a change in the electric field caused by an occupancy state of the seat, the circuit further configured to allow a plurality of coupling impedances between the sensor and shield;
wherein the system calculates a measure related to the impedance from the sensing electrode to ground using the results of separate measurements taken while the coupling impedances are in different configurations.

19. The occupant sensing system of claim 18, wherein the calculated impedance from the sensing electrode to ground is used to classify an occupant of a vehicle seat.

20. A method for measuring a change in capacitance at a vehicle sensor based on an impedance from the sensor to ground, comprising the steps of:
generating an electric field at a capacitive sensing electrode;
driving the shield layer with a signal substantially equal to the sensing signal and measuring the current sent to the sensing electrode;
driving the shield layer with a signal marginally different than the sensing signal and measuring the current sent to the sensing electrode;
driving the shield layer with a signal substantially equal to the sensing signal while electrically coupling the sensing electrode and shield electrode together and measuring the current sent to the sensing electrode;
driving the shield layer with a signal marginally different than the sensing signal while electrically coupling the sensing electrode and shield electrode together and measuring the current sent to the sensing electrode; and
determining the impedance from the sensing electrode to ground based on the four measurements,
wherein the determined impedance from the sensing electrode to ground does not include an impedance from the sensing electrode to the shield layer.

21. The method of claim 19, wherein the determined impedance from the sensing electrode to ground is used to classify an occupant of a vehicle seat.

* * * * *